(12) United States Patent
Leblanc

(10) Patent No.: US 6,854,770 B2
(45) Date of Patent: Feb. 15, 2005

(54) PIPE OR THE LIKE, A FEMALE END RING, AND A METHOD OF MANUFACTURING SUCH A PIPE OR THE LIKE

(75) Inventor: Charles François Leblanc, Nanterre (FR)

(73) Assignee: Bonna Sabla, Paris (FR)

( * ) Notice: Subject to any disclaimer, the term of this patent is extended or adjusted under 35 U.S.C. 154(b) by 196 days.

(21) Appl. No.: 10/026,357

(22) Filed: Dec. 21, 2001

(65) Prior Publication Data

US 2002/0101077 A1 Aug. 1, 2002

(30) Foreign Application Priority Data

Dec. 22, 2000 (FR) .............................................. 00 16911

(51) Int. Cl.[7] .............................................. F16L 49/00
(52) U.S. Cl. ....................... 285/230; 285/231; 285/235; 285/332.2; 285/332.3; 285/347; 285/369; 285/417
(58) Field of Search ................................. 285/230, 231, 285/235, 236, 237, 332.2, 332.3, 369, 417, 347

(56) References Cited

U.S. PATENT DOCUMENTS

| 1,958,063 | A | * | 5/1934 | Milling | ................... 285/285.1 |
| 2,131,839 | A | * | 10/1938 | Hall | ............................. 285/349 |
| 3,334,928 | A | * | 8/1967 | Schmunk | ..................... 285/110 |
| 3,498,645 | A | * | 3/1970 | Kowalewski et al. | ........ 285/230 |
| 3,592,491 | A | * | 7/1971 | Glover | ......................... 285/230 |
| 4,371,179 | A | * | 2/1983 | Bohman | ..................... 277/616 |
| 4,380,348 | A | * | 4/1983 | Swartz | ........................ 285/236 |
| 4,538,837 | A | * | 9/1985 | Cronk | ........................... 285/55 |
| 4,703,940 | A | | 11/1987 | Dana | |
| 4,711,473 | A | * | 12/1987 | Glover | ........................ 285/235 |
| 5,180,196 | A | | 1/1993 | Skinner | |
| 5,280,972 | A | * | 1/1994 | Andersson | ................... 285/230 |
| 5,951,812 | A | | 9/1999 | Gilchrist, Jr. | |

FOREIGN PATENT DOCUMENTS

| CH | 364667 | 9/1962 | |
| DE | 297 11 027 U 1 | 9/1997 | |
| DE | 200 16 118 U 1 | 12/2000 | |
| EP | 459797 A | * 12/1991 | ................. 285/230 |
| FR | 2 292 918 A | 6/1976 | |

* cited by examiner

Primary Examiner—James M. Hewitt
(74) Attorney, Agent, or Firm—Levine & Mandelbaum

(57) ABSTRACT

A pipe formed from a concrete cylinder has an end ring with a ferrule which can be snuggly mounted on one end of the pipe and a skirt axially adjacent to the ferrule for receiving a mail endpiece of another pipe. The ferrule is expanded as it is mounted on the cylinder and exerts a compressive force against the outer peripheral face of the cylinder for forming a secure seal. A rib may be disposed on an inner annular surface of the ferrule and an adhesive may be applied for enhancing the seal between the cylinder and the ferrule.

30 Claims, 8 Drawing Sheets

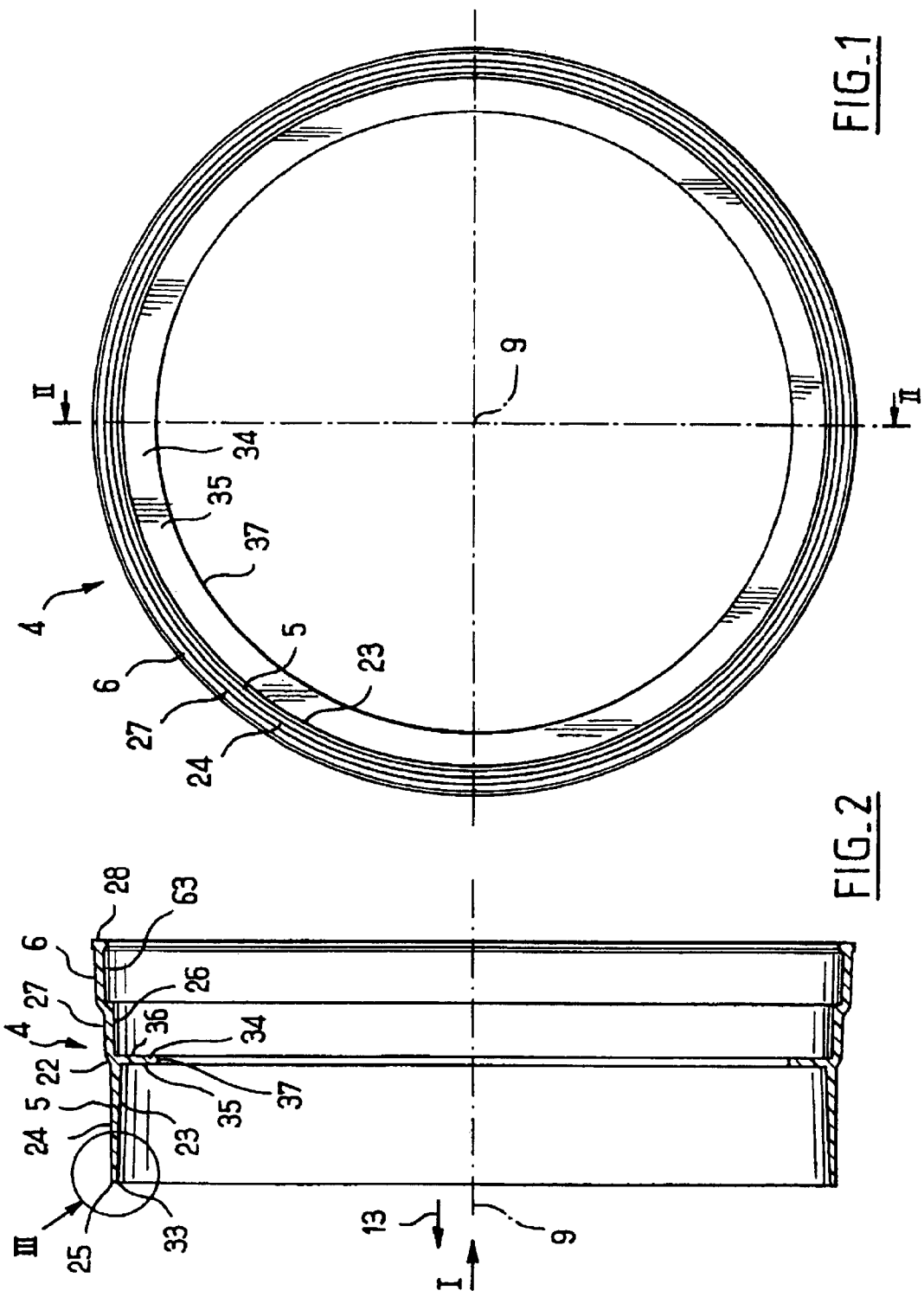

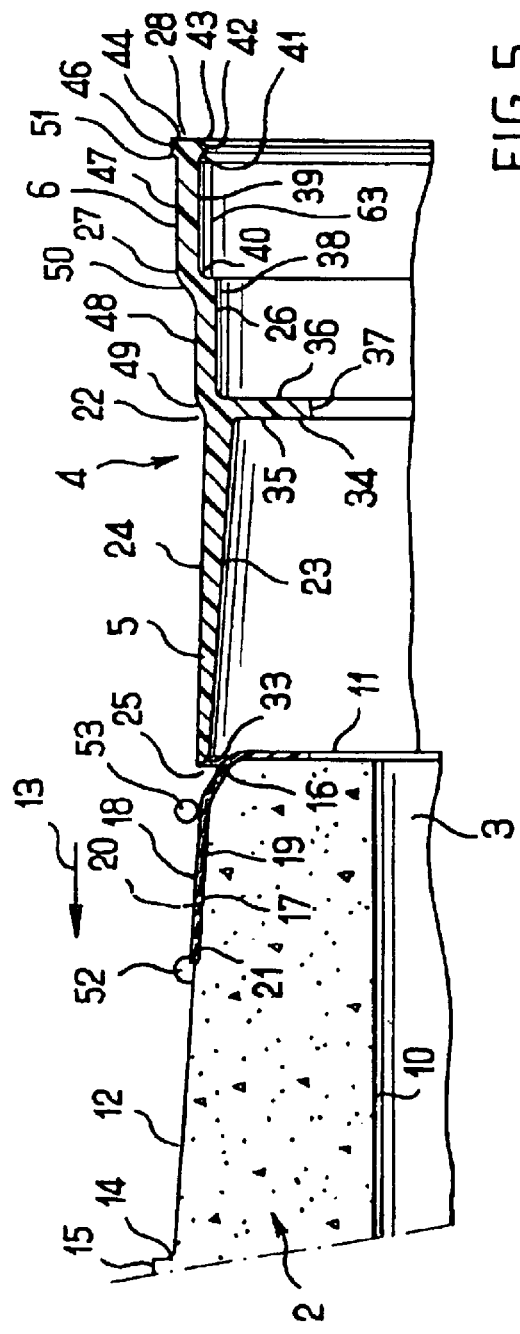
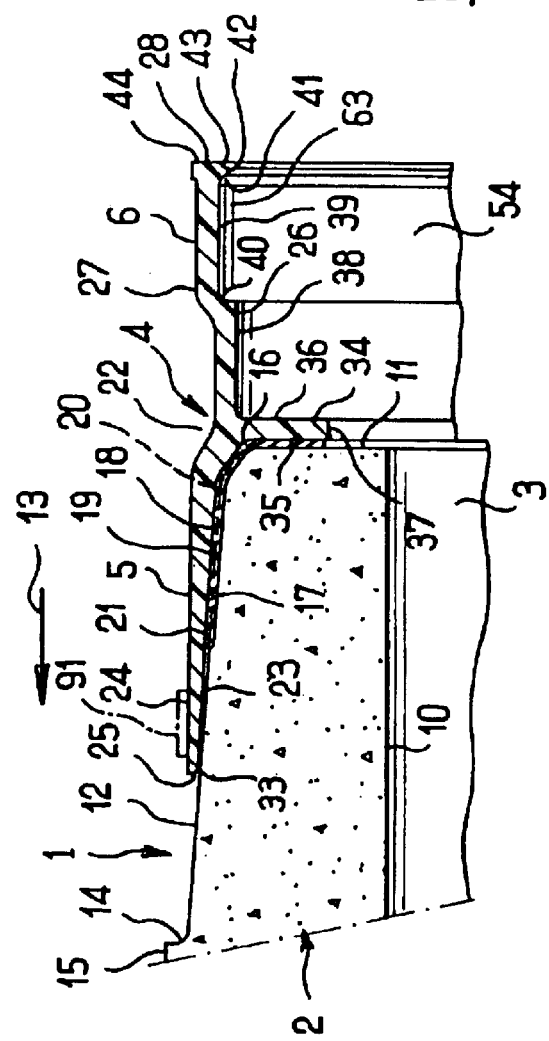
FIG.5
FIG.6

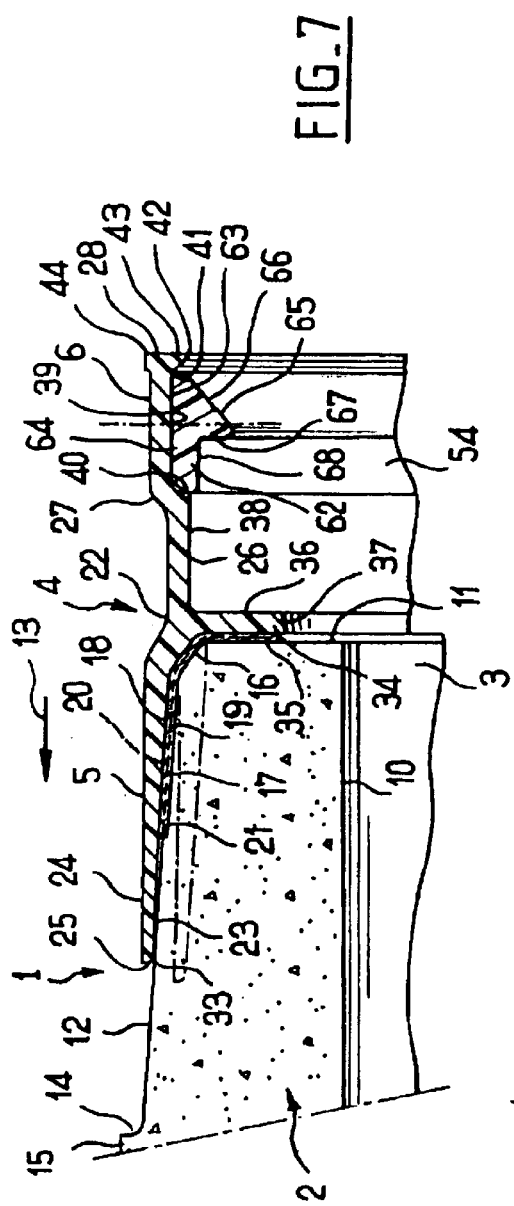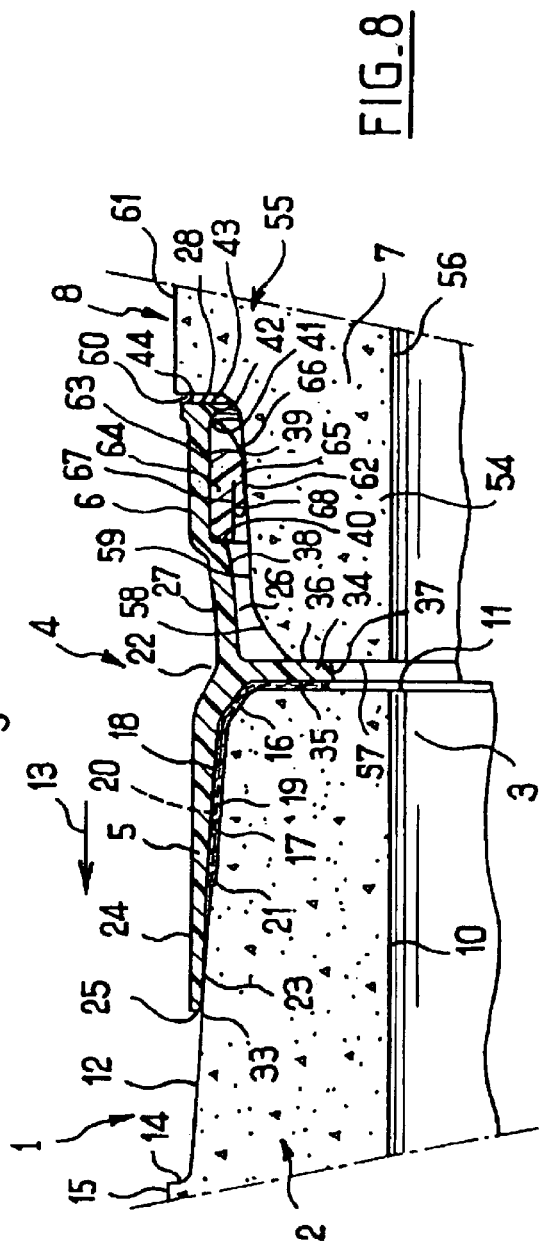

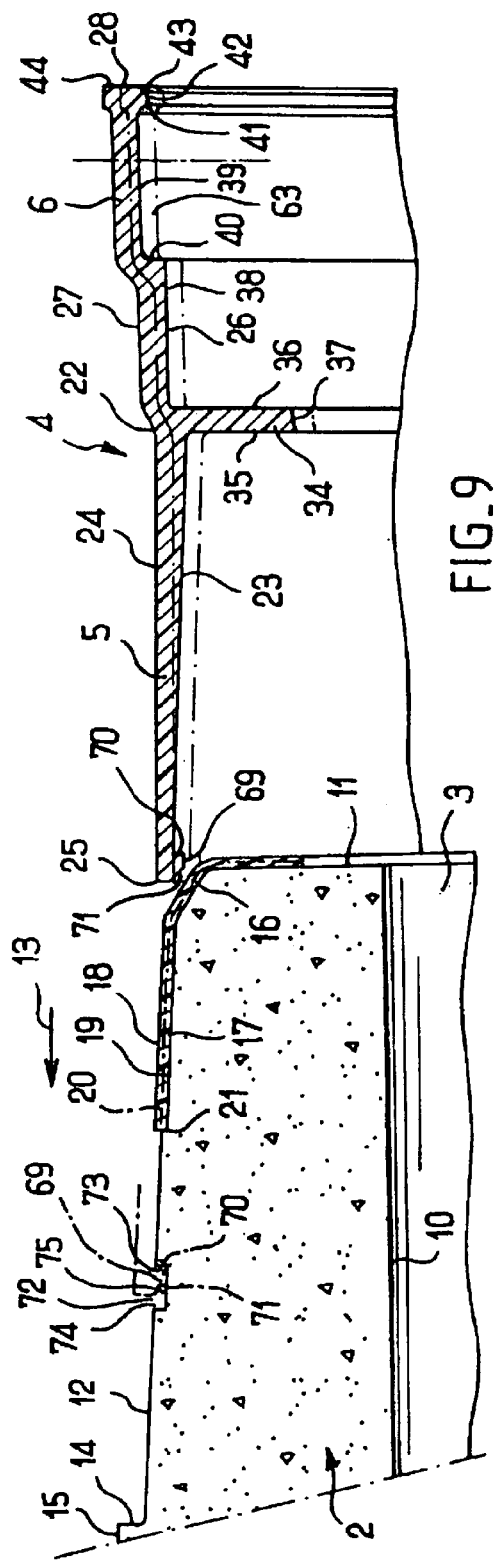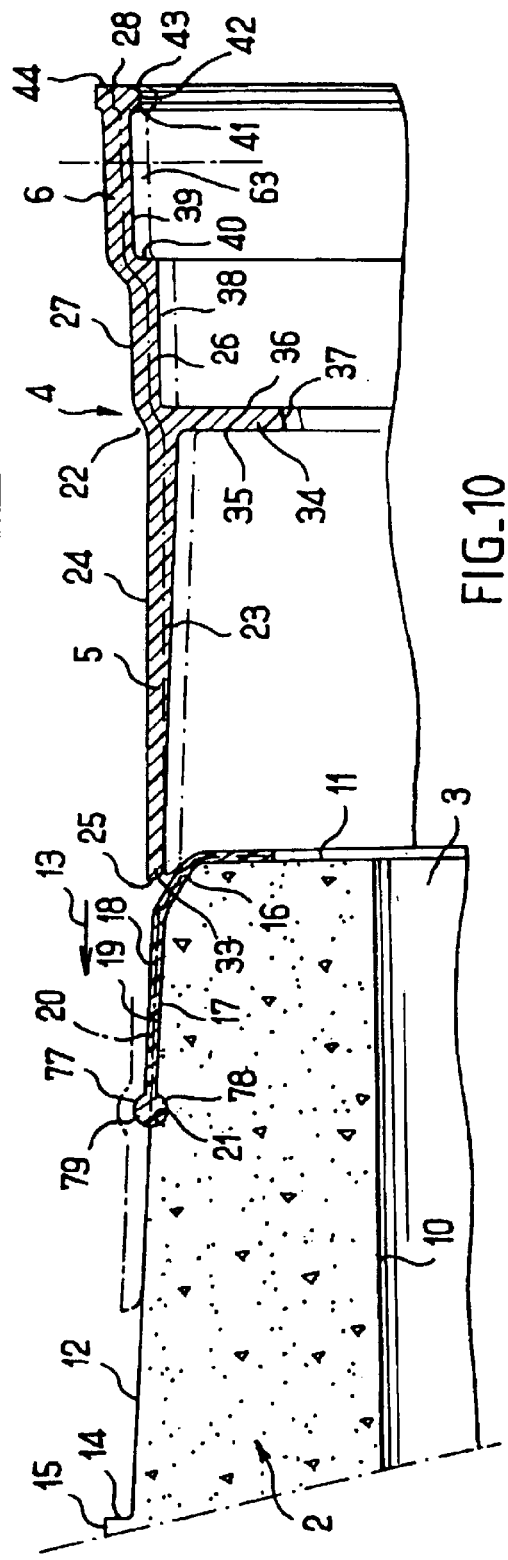

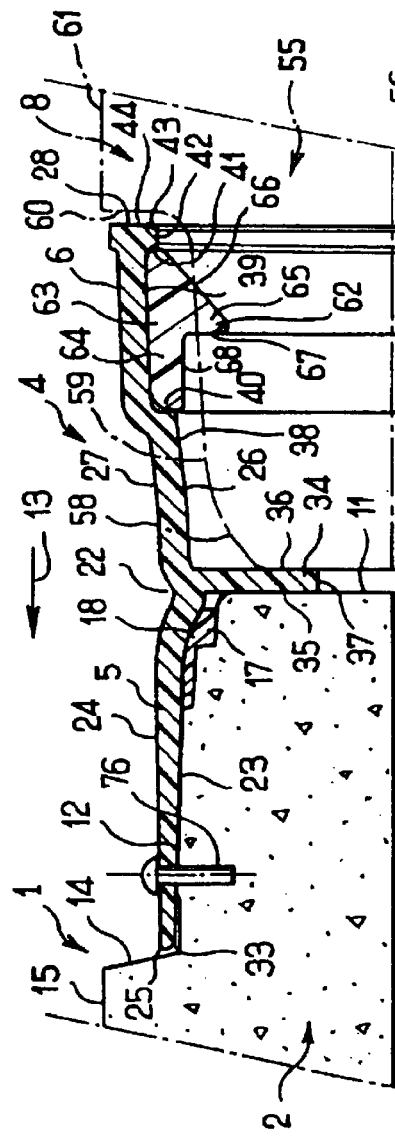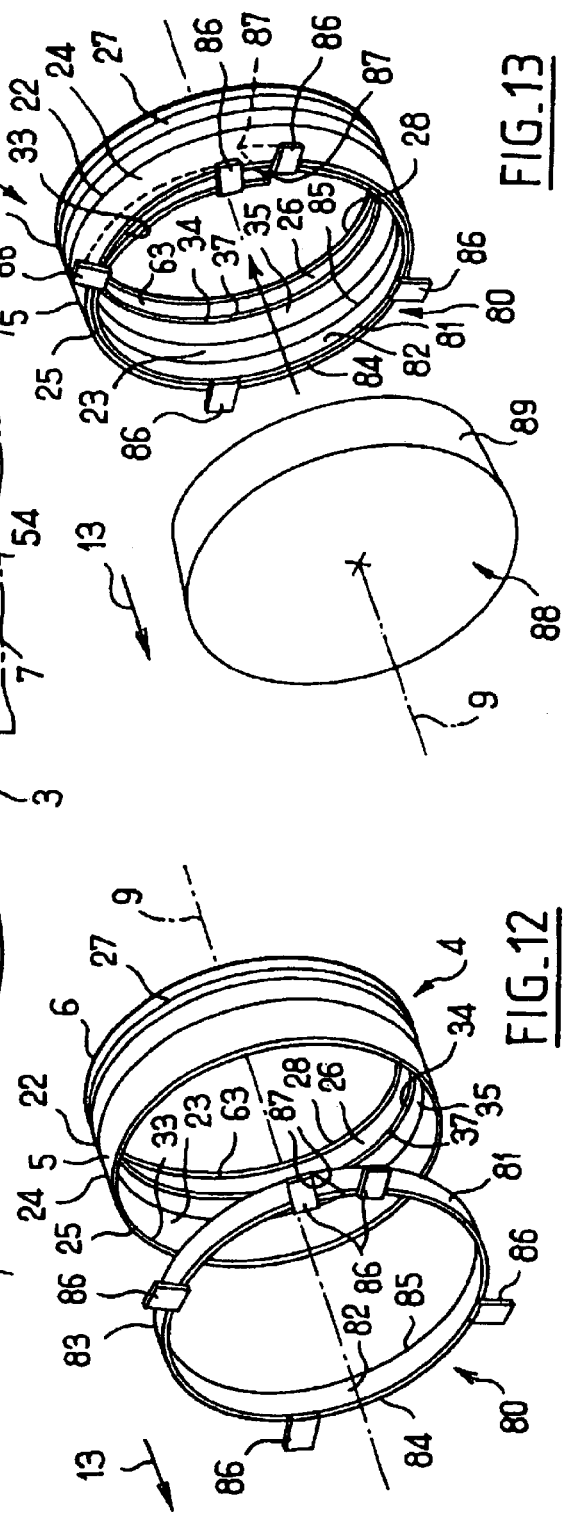
FIG. 11
FIG. 12
FIG. 13

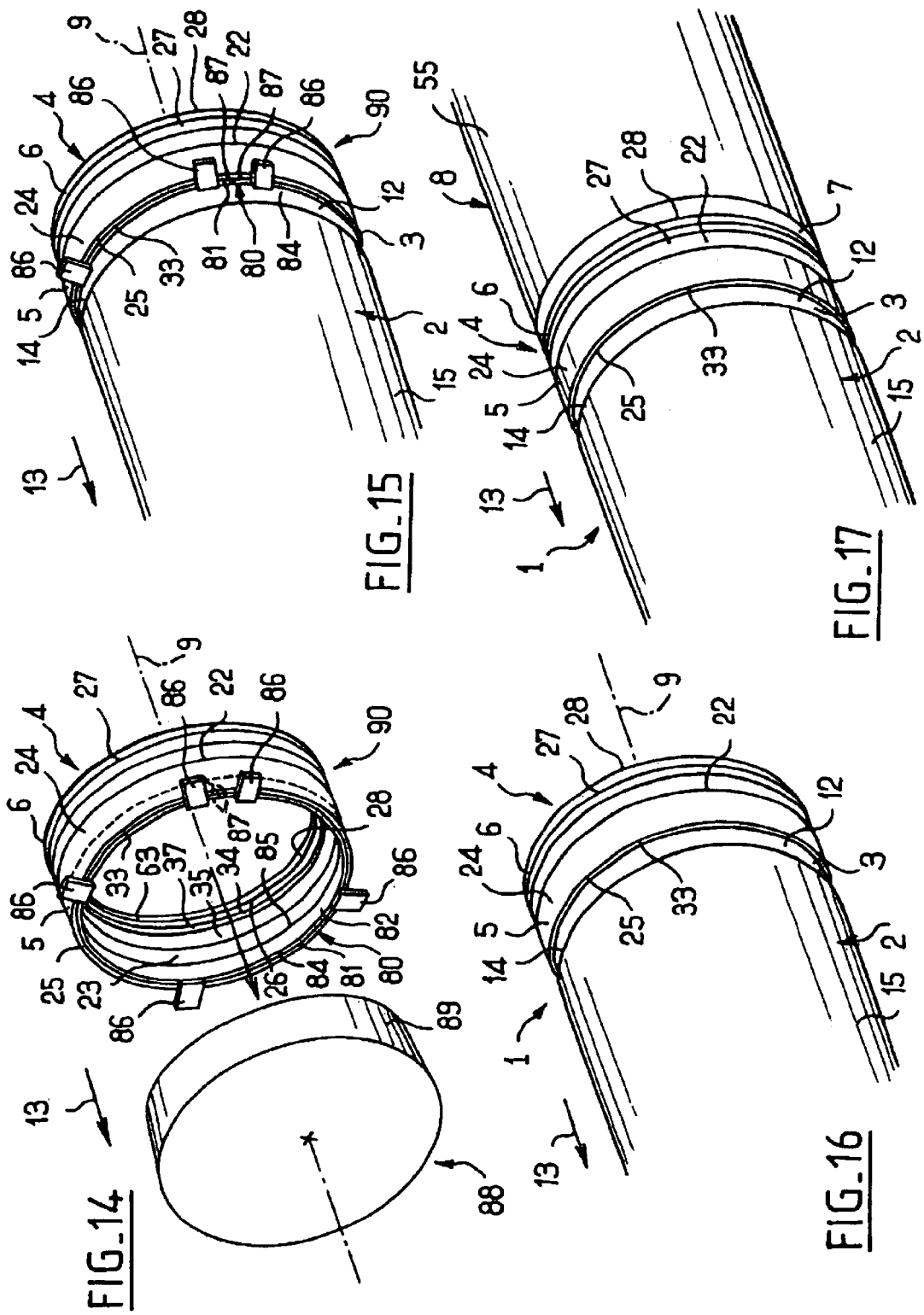

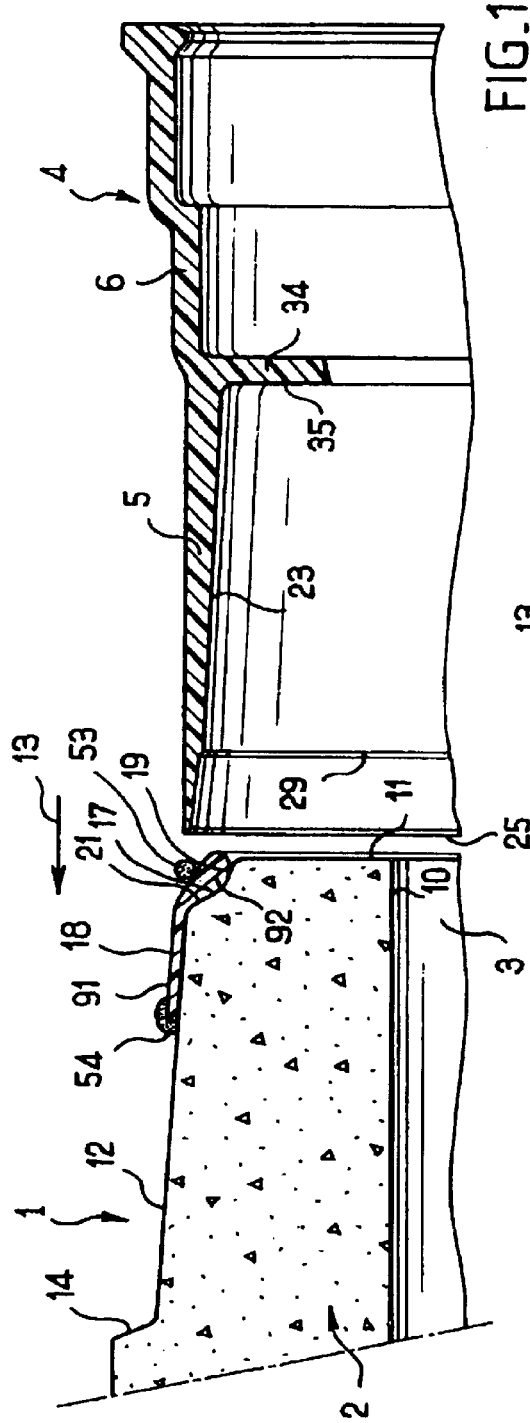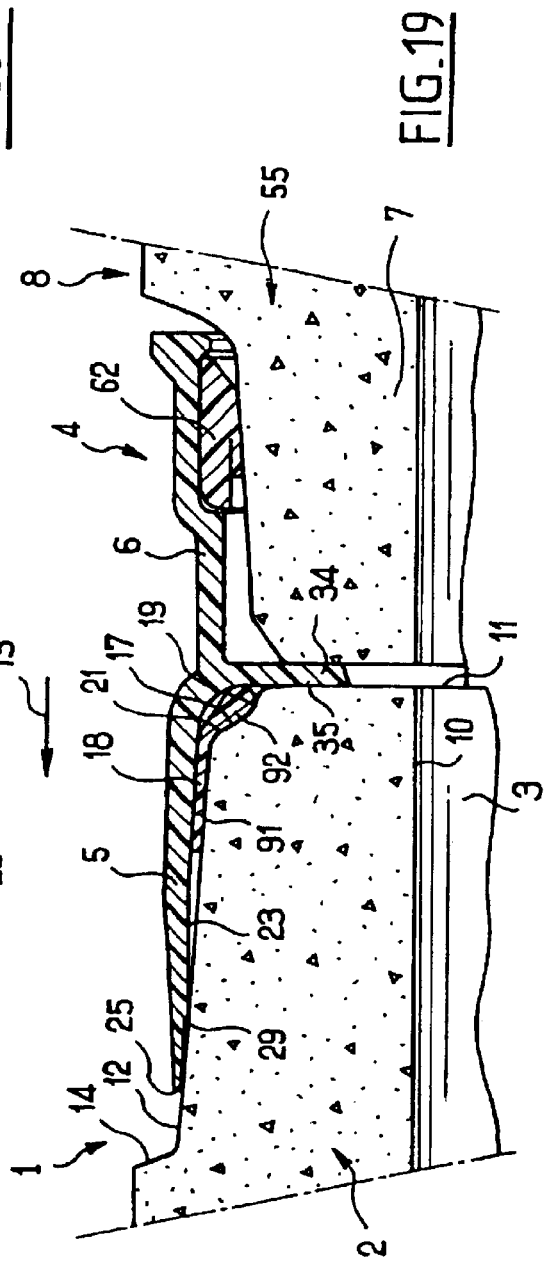

PIPE OR THE LIKE, A FEMALE END RING, AND A METHOD OF MANUFACTURING SUCH A PIPE OR THE LIKE

BACKGROUND OF THE INVENTION

The present invention relates to a pipe or the like, of the type comprising:

- a concrete cylinder possessing at least one annular end of determined longitudinal axis, defined in particular by a longitudinal outside peripheral face and by a transverse front face;
- a female end ring coaxial with said end and secured thereto, the ring consisting in:
  - firstly a longitudinal ferrule for securing to the cylinder, the ferrule being defined in particular by a longitudinal inside peripheral face fitting snugly against said outside peripheral face in the immediate vicinity of said front face; and
  - secondly a longitudinal skirt projecting longitudinally over said front face to engage coaxially on a male endpiece of another pipe or the like.

The term "the like" as used herein with respect to pipes means building elements and ducts that can be assembled by being engaged mutually, such as galleries, access holes, so-called "ovoid" interfittable ducting, ducts of the type sold under the registered trademark "MODULOVALE", and shelter modules, with these examples not being limiting in any way, providing said outside peripheral face presents a cross-section that is curved and convex, either in usual manner or else following simple adaptation in order to implement the present invention.

Similarly, the term "concrete" should be understood herein in its most general sense, covering in particular both concrete based on resin and concretes based on a mineral binder.

In the present state of the art, the female end ring made of metal or of synthetic material is usually fastened to the cylinder by overmolding the cylinder directly onto the ferrule. By way of example, such a technique is described for a female end ring of synthetic material in British patent application No. 2 217 418, which also mentions the possibility of fixing the ring on the cylinder after the cylinder has been made, probably by using a cement given the complexity of some of the shapes described.

The fastening obtained in that way between the female end ring and the cylinder can be satisfactory providing the precaution is taken of shaping the ferrule in such a manner as to obtain mutual anchoring via complementary shapes, however whatever precautions are taken in this respect, sealing between the ferrule and the cylinder remains problematic, even if sealing is defined merely as an absence of any visible seepage of a liquid placed at a pressure close to ambient pressure going from one side to the other of the gasket between the ferrule and the cylinder.

Proposals have also been made, in U.S. Pat. No. 5,180,196, and specifically with reference to FIG. 6 of that document, to make a female endpiece on a longitudinal concrete cylinder by longitudinally engaging a ferrule-forming zone of a longitudinal female end ring on an outside peripheral face at one annular end of the cylinder under conditions such that another zone of the ring forms a skirt projecting longitudinally from the front face of the cylinder for receiving internally a pipe of different design.

Sealing between the ferrule of the female end ring and the outside peripheral face at the end of the cylinder is then provided by two transverse annular bands that are tightened by screws, locally surrounding the ferrule and locally pressing against the outside peripheral face at the end of the cylinder, thus also providing mutual fastening by friction between the cylinder and the female end ring.

The use of such bands can limit the applications of the pipe or the like made in that way in that the material from which the bands are made, which material is dictated by considerations of a mechanical nature, can be incompatible with certain installation conditions for the pipe or the like. Thus, as a general rule, bands are made of steels of a grade that is selected as a function of criteria concerning traction strength and modulus of elasticity, but such seals are generally vulnerable to corrosion and are consequently unusable whenever the pipes or the like are to be buried (unless they are subjected to additional anti-corrosion protection and/or treatment which is expensive and of short-term effectiveness).

In addition, the effectiveness of the sealing and the fastening between the ferrule of the female end ring and the outside peripheral face at the end of the cylinder then depends on the magnitude of the transverse pressure between them, which in turn depends on the value of the transverse pressure applied by the annular bands to the outside of the ferrule, and consequently to a circumferential tension given to the annular bands by screw-tightening.

Unfortunately, the pressure applied by the bands to the ferrule gives rise to transverse thrust pressure from the ferrule of the female endpiece on the outside peripheral face at the end of the cylinder only through the ferrule, making it necessary to ensure that the ferrule tends to shrink onto the outside peripheral face of the end of the cylinder from a rest condition in which it is engaged on said outside peripheral face.

The ferrule has a natural tendency to oppose such shrinkage from its rest condition so obtaining mutual transverse thrust pressure between the ferrule of the female end ring and the outside peripheral face of the cylinder with sufficient magnitude to ensure effective sealing between them and also to ensure that they are effectively fastened together requires a considerable amount of pressure to be developed between the bands and the ferrule by putting the bands under circumferential tension at the risk of causing irremediable damage to the ferrule.

In practice, the desire to avoid any risk of such damage leads to the magnitude of the circumferential tension in the bands and of the pressure they apply to the ferrule being limited, and the tendency of the ferrule to oppose shrinkage means that the magnitude of the transverse thrust pressure actually applied by the ferrule to the outside peripheral face of the cylinder is even smaller, i.e. not only is fastening between them ineffective, but also the resulting sealing is doubtful.

SUMMARY OF THE INVENTION

The object of the present invention is to remedy that drawback and to this end, the present invention provides a pipe or the like of the type specified in the introduction, characterized in that the ferrule is in a state of circumferential elastic tension providing sealing relative to said outside peripheral face by said inside peripheral face applying thereagainst transverse pressure which is circumferentially distributed in continuous manner.

Between the cylinder and the ferrule of the ring, and regardless of whether the ferrule is made of metal or of synthetic material, this transverse pressure creates contact that is much more intimate than in the prior art, with this intimate contact considerably improving mutual sealing.

Depending on the respective shapes of the inside peripheral face of the ferrule and of the outside peripheral face of the cylinder, and depending on the relative coefficient of friction between them, said circumferential elastic tension can also be such as to cause said inside peripheral face to be fastened at least in part to said outside peripheral face by the mutual friction effect that results from said transverse pressure, which effect can be reinforced by clamping the ferrule onto the outside peripheral face of the cylinder by means of at least one band surrounding the ferrule coaxially and placed under circumferential tension, supposing that such a band is technically feasible, in particular given the conditions under which the pipe or the like is to be installed.

Under such circumstances, and contrary to that which happens in the case of a female endpiece made in accordance with the teaching of U.S. Pat. No. 5,180,196, the band is merely optional and does no more than supplement, if necessary, a natural tendency of the ferrule that is placed in a state of circumferential elastic tension on the outside peripheral face of the cylinder to press elastically against said outside peripheral face, tending to establish mutual sealing and, where appropriate, mutual fastening. Thus, for a pipe or the like in accordance with the invention, instead of the ferrule and the band acting against each other in this respect, they become complementary, and the magnitude of the pressure which the band must apply to the ferrule in order to achieve a required magnitude of transverse contact pressure between the ferrule and the outside peripheral face of the end of the cylinder can remain considerably lower than with a pipe or the like in accordance with the teaching of the above-cited American patent.

Such a pipe of the invention can be made by a method including an initial step consisting in prefabricating a female end ring itself characteristic of the invention, presenting a longitudinal axis and constituting:

firstly a longitudinal ferrule defined in particular by a longitudinal inside peripheral face; and secondly a longitudinal skirt situated axially in line with the ferrule, the ring being characterized in that the ferrule is elastically expandable circumferentially.

This method, likewise characteristic of the present invention, is itself characterized in that it comprises the following succession of steps:

a) prefabricating the cylinder independently of the ring, the ring being in accordance with the present invention and being dimensioned in such a manner that, at a determined longitudinal distance from the transition between the ferrule and the skirt, and in the absence of the ring being expanded circumferentially, said inside peripheral face presents transverse dimensions that are smaller than those presented by said outside peripheral face at the same longitudinal distance from said front face, but sufficiently close thereto to be capable of being increased to said dimensions by putting the ferrule under circumferential elastic tension; and b) engaging the ferrule coaxially on the annular end of the cylinder to a determined relative position in which said transition coincides longitudinally with said front face, and fastening the ferrule to the cylinder in said determined relative position by placing said ferrule in a state of circumferential elastic tension providing sealing relative to said outside peripheral face by said inside peripheral face applying thereto transverse pressure that is distributed circumferentially in continuous manner.

When the above-specified conditions are satisfied for said circumferential elastic tension being such that said inside peripheral face is fastened to said outside peripheral face at least in part by a mutual friction effect resulting from said transverse pressure, then this effect can be reinforced by banding the ferrule in said determined relative position.

Step b) can be implemented by engaging the ring via its ferrule coaxially and by force on the annular end of the cylinder. This operation can be made easier if, respectively during the initial step and during step a), the ring and the cylinder are prefabricated in such a manner that said outside peripheral face and/or said inside peripheral face flare relative to their respective longitudinal axes in the longitudinal direction going away from said front face and relative to the transition between the ferrule and the skirt, respectively, preferably ensuring that the outside peripheral face is flared to a greater extent that said inside peripheral face relative to the respective longitudinal axes, thus enabling the engagement to be made progressive. It is also possible to facilitate such engagement by interposing a lubricant between said inside and outside peripheral faces in order to facilitate this operation.

The presence of such a lubricant nevertheless suffers from reducing the effect of mutual fastening by friction that can result from the circumferential elastic tension of the ferrule, and it is preferable to implement step b) in a manner that is characterized in that coaxial engagement of the ferrule on the annular end of the cylinder during step b) is facilitated by placing the ferrule in a state of circumferential expansion greater than that which corresponds to said state of circumferential elastic tension, until said relative position has been reached, and in that the ferrule is allowed to leave said state of circumferential expansion so as to allow said transverse pressure to be established once said relative position has been reached.

For example, the ferrule is placed in said state of circumferential expansion by means selected from the group comprising mechanical means and thermal means.

Various dispositions can be adopted to increase the mutual sealing effect, and where appropriate, the mutual fastening, that is obtained by applying the inside peripheral face of the ferrule under transverse pressure against the outside peripheral face of the cylinder.

In particular, provision can be made for said inside peripheral face to present at least one continuous annular portion in relief providing sealing relative to said outside peripheral face, being in a state of elastic and/or plastic transverse compression thereagainst, and formed integrally with the ferrule.

In particular, when said outside peripheral face and/or said inside peripheral face flare in the longitudinal direction going away from said front face and relative to the transition between the ferrule and the skirt, in particular for the purpose of making it easier to put the ferrule into place on the cylinder, at least one portion of said continuous annular relief can advantageously be provided to be present in the form of a rib.

The term "rib" is used herein to mean a portion in relief that is solid in shape when seen in section on a plane that contains the axis, and in particular a portion in relief formed by a step in the inside peripheral face of the ferrule and suitable for working essentially in compression against the outside peripheral face of the cylinder in order locally to increase the transverse mutual contact pressure between the inside peripheral face of the ferrule and the outside peripheral face of the cylinder around a continuous ring in order to improve relative sealing between them, and in opposition to a sealing lip which would operate for this purpose essentially in bending by having a long thin shape when seen in section on a plane containing the axis of the cylinder.

A person skilled in the art will readily understand that the presence of at least one continuous annular sealing portion in relief on the inside peripheral face of the ferrule can also increase the effect whereby the ferrule is fastened to the cylinder, when the above-specified conditions are satisfied for ensuring that the inside peripheral face of the ferrule is fastened to the outside peripheral face of the cylinder, at least in part, by a mutual friction effect.

Nevertheless, whether as a supplement or as a replacement, and if the transverse pressure between the inside peripheral face of the ferrule and the outside peripheral face of the cylinder is insufficient on its own to guarantee mutual fastening, provision can be made for said inside peripheral face to be fastened to said outside peripheral face by annular adhesive between them, in particular continuously annular adhesive, thus also improving mutual sealing.

A preferred implementation of the method of the invention for this purpose is characterized in that between steps a) and b), a ring of adhesive, in particular a continuous ring, is deposited on a localized zone of said outside peripheral face and/or of said inside peripheral face selected in such a manner that when implementing step b) and thereafter said zone constitutes a zone of mutual contact via said adhesive and of application of said transverse pressure.

To further improve the sealing, it is also possible to provide that the pipe or the like of the invention has at least one continuous ring of a plastic sealing material interposed between said inside peripheral face and said outside peripheral face.

A preferred implementation of the method of the invention for this purpose is characterized in that between steps a) and b), at least one continuous ring of plastic sealing material is placed on said outside peripheral face and/or said inside peripheral face, and in that during step b), said plastic sealing material between said inside peripheral face and said outside peripheral face is caused to be flattened and/or to creep.

For these same purposes of improving sealing, it is also possible to provide for the pipe or the like of the invention to include an annular sealing gasket of elastically compressible material interposed in elastic transverse compression stress between said inside peripheral face and said outside peripheral face, at least in the immediate vicinity of said front face.

A preferred implementation of the method of the invention, for this purpose, is characterized in that between steps a) and b), a sealing gasket of elastically compressible material is put into place on said outside peripheral face at least in the immediate vicinity of said front face, and in that during step b), said gasket is put into elastic transverse compression stress between said inside peripheral face and said outside peripheral face.

Preferably, said outside peripheral face presents an annular setback occupying at least the immediate vicinity of said front face, and said gasket is received over a fraction of its transverse dimension in said setback.

This makes it possible to provide effective retention of the sealing gasket on the outside peripheral face of the cylinder, in particular before and during installation of the ferrule thereon, and for the sealing gasket to benefit from greater thickness, thereby increasing its mechanical strength particularly in shear between the outside peripheral face of the cylinder and the inside peripheral face of the ferrule, and leaving room for a greater elastic compression stroke which is favorable to matching the sealing gasket specifically to the surface state of the outside peripheral face of the cylinder, thereby improving sealing. The localized setback in the outside peripheral face of the annular end of the cylinder is advantageously made during prefabrication thereof, in step a) of the method of the invention, and said gasket is put into place between steps a) and b), being received over a fraction of its transverse dimension in said setback.

Nevertheless, said gasket can advantageously be in the form of a film, and in particular a film which extends from said front face over a longitudinal dimension that is less than the longitudinal dimension respectively of said outside peripheral face and of said inside peripheral face.

To increase the mutual fastening between the ferrule and the cylinder, the inside peripheral face of the ferrule can be fastened to the film constituting the sealing gasket by means of annular adhesive between them, in particular adhesive occupying a continuous annulus, thus also improving relative sealing. To this end, between steps a) and b) of the method of the invention, and after said film has been put into place, a ring of adhesive, in particular a continuous ring, is deposited on a localized zone of said film and/or of said inside peripheral face which is selected in such a manner that when implementing step b) and thereafter said zone constitutes a zone of mutual contact through said adhesive, and of application of said transverse pressure.

Advantageously, if the ferrule of the ring is put into place on the cylinder by progressive forced coaxial engagement of the ferrule on the annular end of said cylinder, the adhesive used for fastening the inside peripheral face of the ferrule with the above-mentioned film and/or for fastening the inside peripheral face of the ferrule with the outside peripheral face of the cylinder is advantageously selected in such a manner that, when in the fresh state, it constitutes a lubricant making said progressive forced engagement easier, while nevertheless being suitable subsequently for providing the desired mutual fastening.

The above-cited film for constituting a sealing gasket between the outside peripheral face of the cylinder and the inside peripheral face of the ferrule can be placed in such a manner that its thickness at rest is substantially constant, or else in such a manner that it presents at least one continuous annular bulge spaced longitudinally from said front face by a distance that is less than the longitudinal dimension respectively of said outside peripheral face and said inside peripheral face, and leading to a longitudinally localized increase in said tension and in said pressure.

This continuous annular bulge can advantageously correspond to a continuous annular groove in the inside peripheral face of the ferrule, and in particular the hardness and the dimensions of said continuous annular bulge can be selected and step b) can be implemented in such a manner that in the determined relative position said continuous annular bulge causes said corresponding continuous annular groove to be formed in the inside peripheral face of the ferrule, in particular by localized plastic deformation thereof. In particular, under such circumstances, step b) is implemented by placing the ferrule in a state of excess circumferential expansion so as to make it easier to engage coaxially on the annular end of the cylinder until their final determined relative position is reached, in which position the ferrule is allowed to leave this state of excess circumferential expansion and establish the transverse pressure that provides relative sealing as described above, and it is during this reduction in the circumferential expansion of the ferrule that, by pressing its inside peripheral face against the bulge of the film forming the sealing gasket that the ferrule is subjected, on coming into contact with said bulge, to localized plastic deformation which gives rise to a continuous annular groove in correspondence with said bulge.

Preferably, in order to facilitate stopping coaxial engagement of the ferrule on the annular end of the cylinder during step b) in the determined relative position, the ring presents internal longitudinal stop means for engaging said front face at the transition between the ferrule and the skirt, said means projecting transversely relative to said inside peripheral face. Under such circumstances, during step b), coaxial engagement of the ferrule on the annular end of the cylinder is stopped when the longitudinal stop means come into abutment against said front face in register with which the stop means remain positioned once the pipe has been completed. The same stop means can be used as a longitudinal abutment for the male endpiece providing they also project transversely relative to a longitudinal inside peripheral face of the skirt.

The stop means can present a variety of shapes, and in particular they can consist in localized projections regularly distributed angularly around the axis, however in a preferred embodiment these stop means comprise a circumferentially continuous transverse annulus of uniform longitudinal dimension. Such an annulus stiffens the ring locally against any increase in its radial and circumferential dimensions, thus contributing to maintaining the circumferential elastic tension state of the ferrule and the transverse pressure between the inside peripheral face of the ferrule and the outside peripheral face of the annular end of the cylinder once the pipe has been made, i.e. to maintaining the mutual sealing effect and, where applicable, the mutual fastening effect, while also providing at least approximate control over the transverse dimension of the skirt, i.e. control within tolerance limits that are acceptable.

The abutment means can be used to retain the film forming the sealing gasket if, between steps a) and b), a transverse annular rim of said film is formed on said front face of the annular end of the cylinder, in which case, during step b), coaxial engagement of the ferrule of the ring on the annular end of the cylinder is stopped when the longitudinal stop means come into abutment against said front face via said rim, which retains this function as an intermediary through which pressure is applied once the pipe has been completed.

Naturally, when assembling a plurality of pipes or the like in accordance with the invention by engaging a male endpiece of one coaxially in the skirt of the female end ring of another, it is necessary for said ring to be placed in sealing relationship not only with the pipe or the like of which it forms a part, but also with the male endpiece of the other pipe or the like.

To this end, provision can be made to mount a sealing gasket on the male endpiece prior to engaging it in the female endpiece, however it is preferable for the ring to be made in such a manner that its skirt is shaped on the inside specifically to receive and to retain at least one transverse annular gasket providing sealing relative to the male endpiece, and during step a) on manufacture of the ring, or subsequent to step b), e.g. on the site where pipes or the like are being installed, at least one transverse annular gasket is secured to the skirt on the inside thereof to provide sealing relative to the male endpiece.

When it is feared that mutual fastening between the ferrule of the ring and the annular end of the cylinder by a mutual friction effect resulting from the inside peripheral face of the ferrule pressing transversely on the outside peripheral face of the annular end and/or from adhesive between the inside peripheral face of the ferrule and the outside peripheral face of the annular end and/or from a sealing film between said faces and/or from locking a continuous annular groove in the inside peripheral face of the ferrule onto a continuous annular bulge of said film will not be sufficient, then those various means of providing mutual fastening can be supplemented or replaced by other means.

One such means consist in transverse pins regularly distributed circumferentially for fastening the ferrule to the cylinder after step b), and another consists in mutual snap-fastening.

To this end, the female end ring is made in such a form that the ferrule presents at least one catch projecting transversely relative to the inside peripheral face of the ferrule in the immediate vicinity of said edge, e.g. a plurality of such catches that are circumferentially localized and regularly distributed circumferentially, all occupying the same longitudinal position. Then, during step a), the cylinder is prefabricated in such a manner as to present at least one depression in said outside peripheral face for receiving said catch at a longitudinal distance from said front face that corresponds to the longitudinal distance between said catch and the transition between the ferrule and the skirt, there being at least one such catch, and step b) of progressively coaxially engaging the ferrule by force on the annular end of the cylinder is implemented by pressing said at least one catch on said outside peripheral face, thereby elastically deforming the ring increasingly, and then enabling the catch(es) to engage in said at least one depression by elastic return once said determined relative position has been reached so as to retain the ferrule longitudinally on the cylinder in said determined relative position after the pipe has been completed. Preferably, during step a), said depression is made in the form of a transverse annular groove in the outside peripheral face of the cylinder, so that the relative angular orientation of the ring and the cylinder about their common axis is immaterial while they are being engaged coaxially in step b), however it would also be possible to provide for each catch to be associated with a respective localized depression.

Given that making a pipe of the invention, in particular using the method of the invention, makes use of a female end ring of special design, the present invention also extends to such a female end ring, presenting a longitudinal axis and constituting:

firstly a longitudinal ferrule defined in particular by a longitudinal inside peripheral face; and secondly a longitudinal skirt situated axially in line with the ferrule, the ring being characterized in that the ferrule is elastically expandable circumferentially.

The ring can also present the preferred characteristics mentioned above with respect to the pipe or the like or the method of manufacturing it;

In addition, the ferrule and the skirt are preferably of respective shapes and transverse dimensions suitable for enabling a plurality of rings to be releasably nested coaxially one in another by mutual coaxial engagement of the ferrule of one ring with the skirt of another. This makes it possible to store female end rings in a minimum amount of space while waiting for assembly to concrete cylinders, in order to make pipes or the like in accordance with the invention.

DESCRIPTION OF THE DRAWINGS

Other characteristics and advantages of the various aspects of the invention appear in the following description relating to a few non-limiting implementations, and also from the accompanying drawings which form an integral portion of the description.

FIG. 1 is an axial view of a female end ring of the invention as seen by its ferrule in a direction referenced by an arrow I in FIG. 2.

FIG. 2 is a view of the ring in section on a plane containing its axis, such as the plane referenced II—II in FIG. 1.

FIGS. 5 to 8 show respectively the state of a female end ring and the annular end of the tube immediately prior to their being assembled together, their assembled state, their state after a sealing gasket has been placed inside the skirt of the female end ring facing a male endpiece, and their state after such a male endpiece has been inserted in the female endpiece constituted by the skirt of the female end ring, all shown in section on a common plane containing the then common axis of the female end ring, of the annular end of the cylinder, and in FIG. 8, of the male endpiece.

FIGS. 9 and 10 show two variant ways of assembling the ferrule of the female end ring with the annular end of the cylinder, in views corresponding to that of FIG. 5 except that they have added thereto in part and in chain-dotted lines a representation of the ferrule in a state corresponding to that of FIG. 6.

FIG. 11 shows another variant assembly of the ferrule with the annular end of the cylinder, in a view analogous to that of FIG. 7 except that the male endpiece is represented diagrammatically in a position corresponding to that of FIG. 8.

FIGS. 12 to 17 are perspective views showing various stages in assembling the female end ring with the help of means for temporarily holding its ferrule with excessive circumferential expansion on the annular end of the cylinder, the assembly thus achieved between the female end ring and the cylinder, and the subsequent assembly performed on a male endpiece.

FIGS. 18 and 19 are views corresponding respectively to those of FIGS. 5 and 8 showing a variant embodiment of the ferrule of the female end ring and a variant implementation of the sealing between the female end ring and the annular end of the cylinder.

DESCRIPTION OF THE PREFERRED EMBODIMENT

Figure 3:
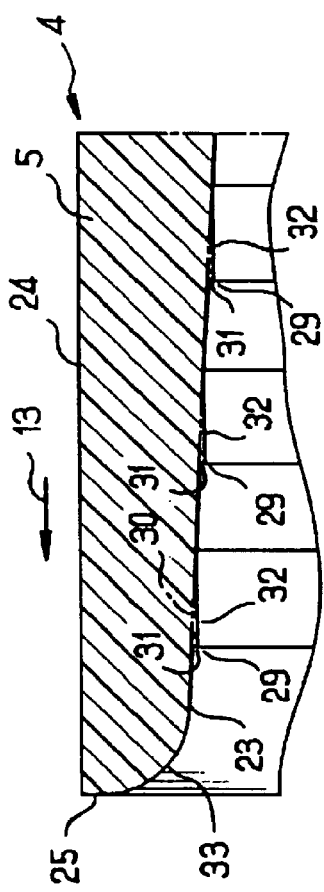
FIG. 3 shows a detail of the skirt referenced III in FIG. 2 and on a much larger scale than that of FIG. 2.

These figures show the invention implemented by making a female endpiece for a pipe in order to provide a leakproof assembly with a male endpiece of another pipe, however a person skilled in the art will readily understand that the present invention can be applied whenever it is necessary mutually to engage in leakproof manner two ducts or other building elements analogous to pipes, in particular those listed in the introduction by way of non-limiting example.

In addition, although the present invention is described below for pipes and female end rings that are both bodies of revolution about a common axis, the invention can also be applied when the pipes or the like present shapes other than being bodies of revolution about their axes, and it comes within the normal aptitudes of a person skilled in the art to adapt the dispositions described below in any manner necessary wherever appropriate.

Insofar as the various implementations of the invention shown in the figures are very analogous to one another, the same numerical references are used to designate elements which correspond from one embodiment to another, specifically: 1 designates the pipe of the invention, 2 its cylinder of tubular shape, in this case a rectilinear cylinder, 3 an annular end thereof, 4 a female end ring of the invention integral with a ferrule 5 for leakproof connection to the annular end 3 of the cylinder 2 and with a skirt 6 forming a female endpiece for the pipe 1, 7 a male endpiece of another pipe 8, which male endpiece 7 is engaged in leakproof manner in the skirt 6 forming the female endpiece of the pipe 1, and 9 a longitudinal axis about which the cylinder 2, in particular its annular end 3, the ring 4, in particular its ferrule 5 and its skirt 6, and the pipe 8, in particular its male endpiece 7 are respective bodies of revolution. In the description below, this axis 9 constitutes the reference for concepts of "axial" or "longitudinal" direction, of "radial" or "transverse" direction, and of "circumferential" direction, and also as a reference for any derived concepts. Similarly, it is considered that an "inside" periphery covers any face looking towards the axis 9, an "outside" periphery covers any face looking away from the axis, while the term "frontal" designates any transverse face, whether it is a face of the cylinder 2, of the pipe 1, of its female end ring 4, or of the pipe 8.

In accordance with one of the aspects of the present invention, the ring 4 and the cylinder 2 are prefabricated separately by molding the cylinder 2 out of concrete and by molding the female end ring 4 as a single piece of synthetic material, e.g. polypropylene, or as a single piece of metal, e.g. stainless steel, or indeed by making it as an assembly of a plurality of pieces of metal, these examples of materials and methods of manufacture not being limiting in any way.

As manufactured and as it remains without modification after being assembled with the ferrule 5, the cylinder 2 is defined over its entire longitudinal dimension, and in particular at its annular end 3, by a circularly cylindrical inside peripheral face 10. At the annular end 3, this inside peripheral face 10 connects with a circularly annular front face 11 that is plane and perpendicular to the axis 9, connecting the inside peripheral face 10 in a direction going away from said axis 9 to an outside peripheral face 12 which is circularly frustoconical, flaring in longitudinal direction 13 away form the front face 11, forming an angle relative to the axis 9, which angle is not referenced but is of the order of a few degrees, e.g. 3.5°, this figure nevertheless merely constituting a non-limiting example. In the direction 13, the face 12 is connected to a main outside peripheral face 15 of the cylinder 2 by a plane transverse annular shoulder 14 facing in the direction opposite to the direction 13, which peripheral face 15 is circularly cylindrical and extends in the direction 13 for example as far as a male endpiece of the pipe 1, which male endpiece is not shown but can be identical to the male endpiece 7 of the pipe 8.

Preferably, as shown, the face 12 connects to the face 11 via a circularly annular chamfer 16. In addition, in the immediate vicinity of its connection with the front face 11, i.e. at the chamfer 16 and over a portion of its longitudinal extent going away from the connection, i.e. from the chamfer 16, e.g. over about half its longitudinal dimension between the front face 11 and the shoulder 14, the face 12 preferably presents an annular setback 17 preferably made during prefabrication of the cylinder 2 and designed to receive a sealing gasket 18 between the annular end 3 of the cylinder 2 and the ferrule 5 of the ring 4. In the example shown in FIGS. 5 to 7, this sealing gasket 18 implemented in the form of a film of elastically compressible sealing material. e.g. a synthetic rubber having hardness of about 60 DIDC, this material and this hardness being given purely by way of non-limiting example, having a thickness or about 1.7 millimeters (mm) in the absence of compression, this figure likewise being given purely by way of non-limiting example, and the setback 17 is defined by a wall 19 having the same cone angle as the face 12 and set back from it by about half the above specified thickness of the gasket or film 18 relative to a geometrical extension 20 of the face 12 from the chamfer 16 to a transverse annular shoulder 21 connecting with the remainder of the face 12, which shoulder 21 is plane, perpendicular to the axis 9, and faces in the direction opposite to the direction 13. Opposite said shoulder 21, i.e. going away from it in the direction opposite to the direction 13, the wall 19 of the setback 17 connects directly with the chamfer 16; correspondingly, and preferably, the film constituting the gasket 18 is dimensioned in such a manner that once it has been put into place on, the wall 19 of the setback 17 so that it is in a state of circumferential elastic extension, it extends in the direction opposite from the direction 13 from the shoulder 21 to the chamfer 16 and goes round the chamfer so as to form a transverse annular rim on the front face 11 over at least a fraction of the radial extent thereof from the chamfer 16 and going no further than the connection between said front face 11 and the face 10, the gasket fitting closely to the wall 19 of the setback 17, to the chamfer 16, and to the corresponding portion of the front face 11, and projecting by about half its thickness relative to the geometrical extension 20 of the face 12 between the shoulder 21 and the chamfer 16 in the absence of any elastic compression being applied to said gasket or film 18.

The sealing film or gasket 18 is thus put into place on the annular end 3 of the cylinder 2 prior to putting the ring 4 into place via its ferrule 5 on said annular end 3.

The female end ring 4 is prefabricated in a shape that can be seen in FIGS. 1 to 5 and which is described below. This shape is that in which the ring 4 is in its rest state, i.e. before it has been subjected to any stress extending it radially and circumferentially, it being understood that securing it to the annular end 3 of the cylinder 2 causes its ferrule 5 to pass to a state in which it is elastically extended circumferentially and radially while the skirt 6 retains at least approximately its rest shape and dimensions. Nevertheless, the ferrule 5 and the skirt 6 are oriented longitudinally and are situated at least approximately longitudinally in line with each other in both states, and they are cantilevered respectively in the direction 13 and in the direction opposite to the direction 13 from a transition 22 between them, which transition forms a circular annulus.

Going from the transition 22, the ferrule 5 is defined by inside and outside peripheral faces respectively 23 and 24 which are connected to each other in the direction 13, i.e. longitudinally going away from the transition 22 along a free edge 25 that constitutes a circular annulus. Similarly, going away from the transition 22, the skirt 6 is defined by inside and outside peripheral faces 26 and 27 which extend in the direction opposite to the direction 13 away from the transition 22 to a free edge 28 that is a circular annulus and that is thus longitudinally opposite from the transition 22.

Considering the ferrule 5 in the rest state, as shown in FIG. 5, its outside peripheral face 24 is substantially a circular-cylinder, it being understood that it could present a small amount of circular conicity converging in the direction 13 so as to make unmolding easier if the ring 4 is made as a one-piece molding. Likewise with the ferrule 5 in the rest state, the inside peripheral face 23 is in the form of a circular truncated cone which diverges in the direction 13 so as to form an angle (not referenced) relative to the axis 9 which is smaller than the angle formed by the outside peripheral face 12 of the annular end 3 of the cylinder 2 relative to the same axis 9, being, for example, about 2.5° when the other angle is about 3.5°, these figures being given purely as non-limiting examples. In addition, the ferrule 5 is dimensioned in such a manner that in the rest state, at a longitudinal distance determined by the transition 22, its inside peripheral face 23 presents transverse dimensions that are smaller than those presented by the outside peripheral face 12 of the annular end 3 of the cylinder at the same longitudinal distance from the front face 11, but sufficiently close thereto to allow them to be expanded to match, and preferably even further, by putting the ferrule 5 under circumferential elastic tension; when the face 12 presents a setback 17, the dimensions to be taken into consideration for the above relationship between the dimensions of the inside peripheral face 23 and the dimensions of the outside peripheral face 12 are the dimensions of the geometrical extension 20 of the face 12 where it overlies the setback 17; in addition, in the presence of a rim of the sealing film or gasket 18 on the front face 11 of the annular end 3 of the cylinder 2, the longitudinal distance that should be taken into account concerning the face 12 needs to include the thickness of the rim in question, i.e. this distance should be measured not from the front face 11 itself, but from the front end of the film or gasket 18 in the direction opposite from the direction 13; naturally, it is generally possible to ignore this thickness of the rim of the film or gasket 18 because this thickness is relatively small and because of the conical shape of the faces 12 and 23, with the longitudinal distance in question being measured from the front face 11 in the direction 13.

The inside peripheral face 23 can be smooth, but to improve a subsequent effect of the ferrule 5 anchoring on the face 12, and where appropriate on the sealing film or gasket 18, it is preferable for it to have the shape shown in FIG. 3 whereby said face 23 presents at least one and preferably a plurality of continuous annular portions in relief 29 that are elastically and/or plastically compressible in a transverse direction, and that are integrally formed with the ferrule 5, e.g. being present in the form of ribs.

Each of these ribs, defined as specified in the introduction and thus forming a localized projection towards the axis 9 from a geometrical extension 30 of the face 23 in the vicinity thereof, is defined, for example, by a transverse annular shoulder 31 facing in the direction 13 and connected to the remainder of the face 23 going away from the axis 9 by a circularly cylindrical annular flank 32, or for unmolding purposes if the ring 4 is made by molding, circularly frustoconical, forming relative to the axis 9 an angle that is smaller than the angle of the remainder of the face 23, said flank 32 connecting the shoulder 31 in its zone closest to the axis 9 to the remainder of the face 23 in the direction opposite to the direction 13. When such ribs or other continuous annular portions in relief 29 are provided in this way, the dimensions to be taken into account for the inside peripheral face 23 when performing the above comparison with the dimensions of the outside peripheral face 12 of the annular end 3 of the cylinder 2 or of the geometrical extension 20 of said face 12 are the dimensions of the face 23 ignoring the ribs or other portions in relief 29, and of the geometrical extension 30 of said face 23 where the ribs or other portions in relief 29 are located.

Going away from the transition 22, the inside peripheral face 23 and the outside peripheral face 24 extend over a longitudinal dimension that is not greater than and that is preferably less than the dimension of the face 12 measured between the shoulder 14 and the front face 11, or where appropriate the limit in the direction opposite to the direction 13 of the rim of the sealing gasket or film 18, but greater than the longitudinal distance between the shoulder 21 of the face 11 or the above-specified limit of the rim of the sealing gasket or film 18. At the free edge 25, the inside and outside endpiece faces 23 and 24 are connected together by a circularly annular chamfer 33 presenting longitudinal dimensions that are negligible compared with the longitudinal dimensions of the faces 23, 24, and 12.

At the transition 22 between the ferrule 5 and the skirt 6, the corresponding outside peripheral faces 24 and 27 connect together directly, whereas the corresponding inside peripheral faces 23 and 26 preferably connect together as shown via a circularly transverse annulus 34 that is circumferentially continuous, presenting a longitudinal dimension or thickness that is uniform and that projects towards the axis 9 from the two inside peripheral faces 23 and 26.

More precisely, the annulus 34 is defined both in the direction 13 and in the opposite direction by respective plane circular annular front faces 35 and 36 perpendicular to the axis 9 and connected respectively to the inside peripheral face 23 and to the inside peripheral face 26 going away from said axis 9. Going towards the axis, these faces 35 and 36 are connected together via an inside end face 37 which could be circularly cylindrical about the axis 9 but which, for unmolding purposes if the ring is made by molding, is in the form of a truncated circular cone about said axis, e.g. converging in the direction 13; nevertheless, the minimum diameter of this end face 37 is greater than the diameter of the inside peripheral face 10 of the cylinder 2, and is preferably approximately identical to the minimum diameter of the rim of the sealing gasket or film 18 formed on the front face 11 at the end 3 of the cylinder 2 when such a rim is provided.

As explained below, the face 35 of the annulus 34 serves as an abutment for the ring 4 in the direction 13 against the front face 11 of the cylinder 2, where appropriate via the rim of the film or gasket 18 on said front face 11, and serves via its face 36 as an abutment against the male endpiece 7 of the other pipe 8 in the direction 13 relative to the ring 4. It could be replaced for these two purposes by internal portions in relief circumferentially localized and distributed around the ring 4 but circumferentially spaced apart, however implementing the abutment means in the form of a continuous annulus is advantageous in stiffening the skirt 6, i.e. in opposing deformation thereof when the ferrule 5 is subjected to circumferential radial expansion, as described below, in order to mount it on the annular end 3 of the cylinder 2. away from the transition with the skirt 6, the skirt is of substantially constant radial thickness substantially identical to and locally greater than the maximum thickness of the ferrule 5, i.e. the thickness presented by the ferrule in the immediate vicinity of the transition 22.

Starting from the transition 22, i.e. the face 36 of the annulus 34, and going in the direction opposite to the direction 13, the inside peripheral face 26 of the skirt 6 presents a plurality of approximately circularly cylindrical segments 38, 39, and 42, ignoring the slight conical shape converging in the direction 13 for unmolding purposes if the ring 4 is made by molding.

The first segment 38 which connects to the base 36 in the direction 13 has a maximum diameter at its end opposite from said connection which is less than the diameter presented by the outside peripheral face 24 of the ferrule 5 at its free edge 25, but greater than the minimum diameter of the inside peripheral face 23, i.e. the diameter it presents where it connects with the face 35 of the annulus 34. Longitudinally opposite from its connection with the face 36, the segment 38 connects with a second one of the above-mentioned segments 39 via a plane annular shoulder 40 extending perpendicularly to the axis 9 and facing in the direction opposite to the direction 13. Where it connects with said shoulder 40, the minimum diameter of the segment 39 is greater than the diameter presented by the outside peripheral face 24 of the ferrule 5 where it connects with the free edge 25, and longitudinally opposite from its connection with the shoulder 40, the segment 39 connects via a circularly annular chamfer 41 to a third one of the segments 42, which segment has a minimum diameter where it connects with the chamfer 41 that is slightly greater than the diameter presented by the outside peripheral face 24 of the ferrule 5 at a longitudinal distance from the free edge 25 that is equal to the longitudinal distance between the shoulder 40 and the chamfer 41. Longitudinally opposite from its connection with the chamfer 41, the segment 42 connects, via a chamfer 43 that is likewise circularly annular, to a front face 44 of the skirt 6, which front face is a plane circular annulus extending perpendicularly to the axis 9 and facing in the direction opposite to the direction 13, and it defines the free edge 28.

Figure 4:
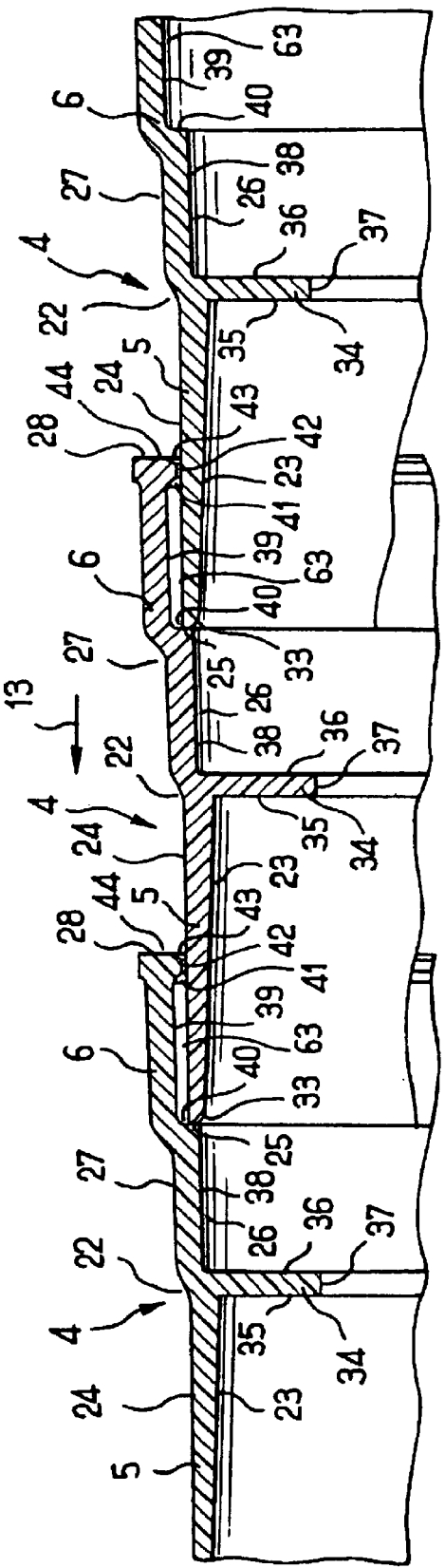
FIG. 4 shows mutual coaxial nesting of a plurality of female end rings of the invention waiting to be mounted on a concrete cylinder for the purpose of making a pipe or the like in accordance with the invention, the rings being shown in section on a plane that contains their axis which is then common.

Given the above-specified dimensions for the segments 38, 38, and 42 of the inside endpiece face 26 of the skirt 6, compared with the dimensions of the outside peripheral face 24 of the ferrule 5, prefabricated rings 4 waiting to be mounted on respective cylinders can be stored in a coaxially nested state as shown in FIG. 4. In this nested state, the ferrule 5 of one ring 4 is engaged in the direction 13 inside the skirt 6 of another ring 4 that is identical and that follows it in the direction 13, and this takes place under conditions such that the free edge 25 of the first ring 4 bears in the direction 13 against the shoulder 40 of the second ring 4 and the segment 42 of the inside peripheral face 26 thereof by forming a transverse abutment for the outside peripheral face 24 of the ferrule 5 engaged in this way prevents the rings 4 from becoming mutually misaligned. Storage can be performed with the coinciding axes 9 either horizontal or vertical, e.g. by stacking nested rings 4, with the bottom ring 4 resting on the ground or on a pallet via the face 44 of its free edge 28.

It will be observed that because of the simplicity of the shapes of the inside peripheral face 26 of the skirt 6, the undercut formed by the chamfer 41 between the segments 39 and 42 does not impede manufacture by molding using techniques well known to molders, it being understood that it could also be obtained by machining to finish off the ring 4 as a final manufacturing step.

Going radially away from the axis 9, the front face 44 connects the chamfer 43 to the outside peripheral face 27 of the skirt 6, which outside peripheral face 27 presents, like the inside peripheral face 26, three approximately circular cylindrical segments about the axis 9, but if it is manufactured by molding these segments taper slightly, converging in the direction 13, these three segments being referenced 46, 47, 48 and following one another in the direction 13 going away from the face 44, and corresponding essentially in a radial direction respectively to the segment 42, to the segment 39, and to the segment 38.

At the transition 22, the minimum diameter of the segment 48 is greater than the maximum diameter presented by the outside peripheral face 24 of the ferrule 5 at said transition 22, and it connects to the outside peripheral face 24 of the ferrule 5 via a circularly frustoconical chamfer 49 converging in the direction 13. The slope of the segment 48 relative to the axis 9 is substantially identical to that of the segment 38 such that the thickness of the skirt 6 between the segments 38 and 48 is approximately constant, and the same applies to the segments 47 and 39. The minimum diameter of the segment 47 is at its junction with the segment 48 in the direction 13, and these two segments 47 and 48 are connected together via a circularly frustoconical chamfer 50 which corresponds to the shoulder 40 and which is located relative thereto in such a manner as to maintain substantially constant thickness for the skirt 6.

In contrast, in the immediate vicinity of the free edge 28 of the skirt 6, the segment 46 and the segment 42 form extra thickness increasing the second moment of area of the skirt 6 for opposing radial and circumferential elastic expansion thereof, and for this purpose the segment 46 presents a minimum diameter where it connects with the segment 47 that is greater than the maximum diameter presented by the segment 47 where it connects with the segment 46, and these two segment 47 and 46 are connected together via a plane circularly annular shoulder 51 extending perpendicularly to the axis 9 and facing in the direction 13.

Once the cylinder 2 and the ring 4 presenting the above characteristics have been manufactured, and where appropriate after the sealing gasket or film 18 has been put into place on the cylinder 2 in the manner described above, manufacture of the pipe 1 is terminated by engaging the ferrule 5 of the ring 4 coaxially onto the annular end 3 of the cylinder 2 in the direction 13 up to a determined relative position as shown in FIG. 6 where the transition 22 between the ferrule 5 and the skirt 6 coincides longitudinally with the front face 11, and more precisely where the face 35 of the annulus 34 comes into abutment in the direction 13 against said face 11, where appropriate via the rim of the film or gasket 18 on said face 11.

Given the dimensional characteristics of the inside peripheral face 23 of the ferrule 5 relative to those of the outside peripheral face 12 of the annular end 3 of the cylinder 2, including the sealing gasket or film 18, if any, this coaxial engagement can be achieved by forcing the inside peripheral face 23 of the ferrule 5 against the outside peripheral face 12 of the annular end 3 of the cylinder 2, optionally carrying the sealing gasket or film 18, thereby progressively putting the ferrule 5 into a state of circumferential elastic tension which reaches its maximum when, relative to the cylinder 2, it reaches the determined position in which the face 35 of the annulus 34 bears in the direction 13 against the front face 11, possibly via the rim of the sealing gasket or film 18. Once this determined relative position has been reached, the circumferential elastic tension in the ferrule 5 is such that via its inside peripheral face 23 it applies transverse pressure that is continuously distributed circumferentially over the face 12 alone, in the absence of the setback 17 and the sealing gasket or film 18, or if such a sealing gasket or film 18 is present, firstly against said sealing gasket or film 18 thereby compressing it transversely, and secondly against the face 12 beyond the shoulder 21 in the direction 13, with this transverse pressure establishing leaktightness between them, which leaktightness is increased if there are any ribs or other portions in relief 29 present, since they create additional transverse pressure around respective continuous transverse rings.

This radial pressure applied by the inside endpiece face 23 of the ferrule 5 against the outside peripheral face 12 of the annular end 3 of the cylinder 2 which fits closely thereagainst, and where present, the sealing gasket or film 18 against which the face 23 also fits closely and which in turn fits closely over the wall 19 of the setback 17, can be sufficient to provide by mutual friction all or part of the fastening between the ferrule 5, i.e. the ring 4, and the cylinder 2, depending on the friction coefficients relating to the various materials thus put into mutual contact, on the slopes of the faces 12 and 23 relative to the axis 9, and on the areas of mutual contact.

Such conditions can be satisfied particularly when there is no need to apply lubricant between the inside peripheral face 23 and the outside peripheral face 12 and the sealing gasket or film 18 for the purpose of putting the ring 4 via its ferrule 5 into place on the end 3 of the cylinder, i.e.:

either because mounting is performed by forced engagement in the absence of a setback 17 and a sealing gasket or film 18; or else in the presence or absence of the setback 17 and the sealing gasket or film 18, when the ring 4 is mounted using a method that is described below with reference to FIGS. 12 to 17.

When such conditions are satisfied, the effect of mutual fastening by friction between the inside peripheral face 23 of the ferrule 5 and the outside peripheral face 12 of the annular end 3 of the cylinder 2 can be reinforced by banding the ferrule 5 after it has reached the determined relative position shown in FIG. 6, using at least one band 91 placed coaxially around the outside peripheral face 24 of the ferrule 5, preferably in the immediate vicinity of its free end 25, as shown in chain-dotted lines in FIG. 6, and after it has been put under circumferential tension using means known to the person skilled in the art so as to increase the pressure applied via the ferrule 5 between the inside peripheral face 23 and the outside peripheral face 12. It will be observed that this banding also has the effect of increasing leaktightness between these faces 12 and 23.

In contrast, if mounting is performed by forced engagement under conditions that require lubricant to be present between the inside peripheral face 23 of the ferrule 5 and the outside peripheral face 12 of the annular end 3 of the cylinder 2 and optionally the sealing gasket or film 18, then the fastening obtained in this way by friction can be insufficient, specifically because the lubricant continues to be present, in which case it must be complemented by suitable means, an example being described below with reference to FIGS. 5 and 6 and other examples being described for variant embodiments of the invention with reference to FIGS. 9 and 11.

The means shown in FIGS. 5 and 6 consist, prior to forced engagement of the ferrule 5 on the annular end 3 of the cylinder 2, and then while said engagement is taking place, in creating a film of adhesive which, while fresh, acts as lubricant to facilitate longitudinal sliding of the face 23 over the sealing gasket or film 18, if any, and over the outside peripheral face 12 of the annular end 3 of the cylinder 2, and subsequently, once the limit position has been reached in which the face 35 of the annulus 34 bears in the direction 13 against the front face 11, optionally via the rim of the sealing gasket or film 18, the adhesive sets between the inside peripheral face 23 of the ferrule 5 and the outside peripheral face 12 of the annular end 3 of the cylinder 2 and the sealing gasket or film 18, if any, thereby fastening the ferrule 5 with the ring 4 to the cylinder 2 and the gasket or film 18, if any, by adhesion in the zone where they are mutually in contact.

So long as care is taken to ensure that such mutual adhesion takes place around a circumferentially continuous ring, it also serves to improve leaktightness.

In particularly advantageous manner, as shown in FIG. 5, the adhesive is applied prior to the ferrule 5 being engaged on the annular end 3 of the cylinder 2 in the form of a continuous ring 52 over a zone of the outside peripheral face 12 that is selected in such a manner that during forced engagement it constitutes a zone of contact with the inside peripheral face 23 of the ferrule 5, e.g. in the immediate vicinity of the shoulder 21 when a setback 17 and a sealing gasket or film 18 are provided, or indeed in the immediate vicinity of the chamfer 16 in the absence of such a setback 17 and such a sealing gasket or film 18. When such a sealing gasket or film 18 is provided, another continuous ring of adhesive 53 can be placed thereon in the immediate vicinity of the transition between the setback 17 and the chamfer 16. Thus, as forced engagement progresses, the face 23 entrains the adhesive of the ring 53 and the adhesive of the ring 52 in succession so as to spread said adhesive over the sealing gasket or film 18 and over the face 12, respectively, in the mutual contact zone while conserving the circumferential continuity of each ring of adhesive that is spread in this way.

In a variant, and in a manner that is not illustrated, the adhesive could also be deposited as a plurality of rings, in particular continuous rings, over the sealing gasket or film 18, if any, and/or over the outside peripheral face 12 of the annular end 3 of the cylinder 2, or indeed as one or more continuous annular rings on the inside peripheral face 23 of the ferrule 5 in zones suitably selected to constitute zones of mutual contact during the process of forced engagement and at the end of said process, with this preferably being done from the beginning of the process.

Also in non-illustrated manner, but in a manner that will easily be understood from that described above for improving leaktightness between the faces 12 and 23 by means of at least one continuous ring 52 of adhesive, said leaktightness could be improved or indeed established, e.g. in the absence of the sealing film 18, by replacing adhesive in the provision of said ring with a plastic sealing material, commonly referred to as "compound", which is caused to be flattened out and/or to creep between the faces 12 and 23 as the above-mentioned engagement process is taking place so that by the end of said process at least one continuous sealing ring has been formed between said faces 12 and 23. Like the above-described adhesive, the plastic sealing material could also be disposed in at least one continuous ring on the inside peripheral face 23 of the ferrule in at least one zone selected to constitute a contact zone with the outside peripheral face 12 of the cylinder 2 during the process of forced engagement and at the end thereof. The sealing provided by the plastic sealing material can replace the sealing provided by the gasket 18 or can be additional thereto in a zone in which said gasket 18 is not interposed between the faces 12 and 23.

At the end of engagement, i.e. when the annulus 34 comes into abutment via its face 35 in the direction 13 against the front face 11 at the annular end 3 of the cylinder 2, possibly via the rim of the gasket or film 18 as shown in FIG. 6, the skirt 6 projects longitudinally from the front face 11 in the direction opposite to the direction 13, thereby constituting a female endpiece 54 for the pipe 1 in line with the annular end 3 of the cylinder 2 to which the skirt 6 is fastened by means of the ferrule 5.

This female endpiece 54 is intended to receive the male endpiece 7 of the pipe 8 by longitudinal engagement in the direction 13, and as shown in FIG. 8.

To this end, and relative to the shape of the skirt 6, the male endpiece 7 presents the known shape for a male endpiece given the shape of the female endpiece in which it is to engage. It can thus present any known design.

In the example shown, the male endpiece 7 is integrally molded as a single piece of concrete with a cylinder 55 of the pipe 8, which cylinder is entirely analogous to the cylinder 2 of the pipe 1 (which in turn can also present a male endpiece identical to the male endpiece 7), and it is located at its end longitudinally opposite from its annular end 3 having the ring 4 fitted thereon, and in like manner the cylinder 55 of the pipe 8 can be provided with a ring analogous to the ring 4 at its end longitudinally opposite from its male endpiece 7.

In the example shown, and if the male endpiece 7 is assumed to be occupying a finally engaged position inside the female endpiece 54 constituted by the skirt 6, as shown in FIG. 8, then the male endpiece 7 is defined towards the axis 9 by an inside peripheral face 56 common to the entire cylinder 55 and constituting a circular cylinder having the same diameter as the face 10 which is extended longitudinally in the direction opposite to the direction 13 by said face 56. In the direction 13, the face 56 connects to a front face 57 of the cylinder 55, which face is a plane circular annulus perpendicular to the axis 9 and faces in the direction 13. Radially opposite from its connection with the face 56, the face 57 presents a maximum diameter which is intermediate between the minimum diameter of the face 36 of the annulus 34 of the ring 4, i.e. the minimum diameter of the end face 37 of said annulus 34, and the minimum diameter of the segment 28 of the inside peripheral face 26 of the skirt 6 of the ring 4, so that the cylinder 55 of the pipe 8 bears flat in the direction 13 via its face 57 against the face 37 of the annulus 34, and via said annulus and the rim of the sealing gasket or film 18, if any, against the front face 11 of the annular end 3 of the cylinder 2 of the pipe 1.

Via its greatest diameter as defined in this way, the front face 57 connects via a circularly frustoconical chamfer 58 that converges in the direction 13 to an outside peripheral face 59 of the male endpiece 7, which face is likewise circularly frustoconical, converging in the direction 13 and forming an angle relative to the axis 9 that is of substantially the same size as the angle formed relative to said axis by the outside peripheral face 12 of the annular end 3 of the cylinder 2. At a longitudinal distance from the front face 57 that is greater than the longitudinal distance between the front face 44 of the skirt 6 of the ring 4 and the face 36 of its annulus 34, the outside peripheral face 59 connects via a chamfer (not referenced) to a circularly annular shoulder 60 that is plane and perpendicular to the axis 9, facing in the direction 13, thereby connecting the outside peripheral face 59 to a main outside peripheral face 61 of the cylinder 55 which is advantageously circularly cylindrical, having a diameter that is identical to that of the main outside peripheral face 15 of the cylinder 2 of the pipe 1, it being possible for the two pipes 1 and 8 to be identical.

Various means can be provided for providing leaktightness between the male endpiece 7 and the female endpiece 54 constituted by the skirt 6, and in particular, and in conventional manner, this can be done by mounting an annular sealing gasket on the outside peripheral face 59 of the male endpiece 7. Under such circumstances, the segment 38 of the inside peripheral face 26 of the skirt 6 of the ring 4 can extend without discontinuity in the longitudinal direction from the face 36 of the annulus 34 to the front face 44 of the skirt 6, and likewise the segment 48 of the outside peripheral face 27 of this skirt 6 can extend without discontinuity from the chamfer 49 to said front face 44, the setbacks constituted by the shoulder 40 and the chamfer 41 in the face 26 being omitted as is the projection formed on the face 27 by the chamfers 50 and 51 and by the segments 46 and 47 of the outside peripheral face.

Such an embodiment is not shown and comes within the normal competence of a person skilled in the art concerning the above modification in the shape of the skirt 6 of the ring 4.

To provide leaktightness, it is also possible for the inside of the skirt 6 to be fastened prior to longitudinal engagement on the male endpiece 7 to at least one transverse annular sealing gasket facing the male endpiece 7.

Such a transverse sealing gasket can be mounted when the ring 4 is prefabricated, or as shown in FIG. 7, it can be mounted after the ring 4 has been fastened via its ferrule 5 on the annular end 3 of the cylinder 2 as shown in FIG. 6 and before the male endpiece 7 of the pipe 8 is engaged as shown in FIG. 8.

In the example shown, only one annular sealing gasket 62 is provided inside the skirt 6, and this annular sealing gasket 62 is fixed and held on the segment 39 of the inside peripheral face 26, e.g. by adhesive, between the shoulder 40 and the chamfer 41 which contributes to preventing it from sliding longitudinally relative to the skirt 6 during engagement of the annular sealing gasket 62 in a circularly annular groove 63 defined as a recess in the inside peripheral face 26 by the shoulder 40, the chamfer 41, and the segment 39.

More precisely, the sealing gasket 62 which is made of an elastically compressible sealing material such as a synthetic rubber presents a longitudinal and circularly annular sleeve 64 complementary in shape to the groove 63 so as to engage therein, and so as to enable it to be fixed to the skirt 6 of the ring 4, e.g. by being stuck to the segment 39 of the inside peripheral face 26, together with an annular transverse sealing portion in relief 65 projecting radially towards the axis 9 from the sleeve 64 and geometrically extending the segment 38 of the inside peripheral face 36 of the skirt 6 of the ring 4. When the sealing gasket 62 is at rest, i.e. when it is not subjected to any stress as is the case prior to the male endpiece 7 of the pipe 8 being longitudinally engaged in the female endpiece 54 defined by the skirt 6, this projection is of radial dimension such that during said engagement the portion in relief 65 comes into contact under pressure against the outside peripheral face 59 of said male endpiece 7, thereby pushing back said portion in relief 65 in the direction 13 (which is the engagement direction) and compressing the portion in relief 65 against the sleeve 64, which itself can optionally be compressed going away from the axis 9 against the segment 39 of the inside peripheral face 26 of the skirt 6 of the ring 4 so as to provide leaktightness between said skirt 4 and the male endpiece 7.

The way in which the portion in relief 65 is shaped and dimensioned for this purpose is readily determined by a person skilled in the art. As a non-limiting example, the portion in relief 65 is defined in the example shown and when in the rest state as shown in FIG. 7 by a circularly frustoconical upstream flank 66 converging in the direction 13 and forming an angle of about 45° relative to the axis 9, and by a circularly annular downstream flank 67 which is plane and perpendicular to the axis 9, where the concept of upstream and downstream are relative to the direction 13. The portion in relief 65 is located approximately in the upstream half of the gasket 62 whose downstream portion is defined by the sleeve 64 which then presents an inside peripheral face 68 constituting a circular cylinder. Once the male endpiece 7 of the pipe 8 has been engaged fully in the female endpiece 54 defined by the skirt 6 of the ring 4, i.e. once the front face 57 comes to bear flat in the direction 13 against the face 36 of the annulus 34, as shown in FIG. 8, the portion in relief 65 is folded downstream against the sleeve 64 under conditions such that its face 67 is snug against the face 68, with the assembly constituted by the portion in relief 65 and the sleeve 64 being compressed away from the axis 9 against the segment 39 of the inside peripheral face 26 of the skirt 6 of the ring 4 so as to provide leaktight sealing.

Naturally, the sleeve 64 and the portion 65 of the sealing gasket 62 are circumferentially continuous for this purpose.

The description above with reference to FIGS. 5 to 8 describes how the ferrule 5 of the ring 4 can be fastened to the annular end 3 of the cylinder 2 either by friction or by adhesive.

FIG. 9 shows a technique relying on snap-fastening, which can be in addition to or instead of the above two fastening techniques.

In FIG. 9, the various portions of the cylinder 2 and of the ring 4 as described above with reference to FIGS. 5 and 8 are shown again identically and using the same numerical references, with the FIG. 9 variant differing from that described with reference to FIGS. 5 to 8 only in the additional characteristics that are described below.

One of these characteristics consists in the ferrule of the ring 4, as prefabricated, presenting at least one fastening catch in relief 69 in the immediate vicinity of its free edge 25 and projecting from its inside peripheral face 23, the catch 69 being designed to engage the outside peripheral face 12 of the annular end 3 of the cylinder 2, and preferably being provided in the form of a plurality of catches each localized circumferentially and together distributed regularly around the circumference, and all occupying the same longitudinal position. The person skilled in the art can easily determine the number of catches 69 needed to achieve the mechanical strength required to prevent the ferrule 5 becoming detached longitudinally from the annular end 3 of the cylinder 2.

In the example shown, each of these catches 69 presents on its upstream side relative to the direction 13, a flank 70 that is plane and perpendicular to the axis 9, and on its downstream side, a convex flank 71 presenting a section in a plane that includes the axis 9 which is curved, e.g. circularly arcuate, similar to the chamfer 33, so that the flank 70 connects to the outside peripheral face 24 of the ferrule 5.

The cylinder 2 is prefabricated in such a manner as to present a continuous transverse annular groove 72 in its outside peripheral face 12 in which the catches 69 can engage, as represented by chain-dotted lines in FIG. 9, once the ring 4, on being engaged longitudinally on the cylinder 2, reaches the determined limit position in which it comes into abutment via the face 35 of the annulus 34 against the front face 11 of the annular end 3 of the cylinder 2, and via the rim of the sealing gasket or film 18, if any.

To this end, the groove 72 is defined on the upstream side relative to the direction 13 by an annular flank 73 that is plane, extending transversely perpendicularly to the axis 9 and facing in the direction 13, said flank 73 being situated at a longitudinal distance from the front face 11 or from the upstream limit of the sealing gasket or film 18, if any, on said front face 11 that is substantially equal to the longitudinal distance between each of the upstream facing flanks 70 of the catches 69 and the face 35 of the annulus 34. In addition, the groove 72 is defined by a downstream flank 74 that is likewise plane, annular, and perpendicular to the axis 8, but faces in the direction opposite to the direction 13, said flank 74 being spaced apart longitudinally from the flank 73 by a distance that is not less than the distance between each flank 70 and the free edge 25 of the ferrule 5 of the ring 4, and by a circularly frustoconical bottom wall 75 having a cone angle identical to that of the outside peripheral face 12, with said bottom wall 75 being set back therefrom by a depth that is not less than the transverse dimension of each flank 70.

The ring 4 is thus mounted on the cylinder 2 by progressive forced coaxial engagement of the ferrule 5 in the direction 13 onto the annular end 3 of the cylinder 2, possibly using a lubricant as described above, with the catches 69 pressing via their flanks 71 against the outside peripheral face 12, and against the sealing gasket or film 18, if any, and with the ring 4 progressing in the direction 13 relative to the cylinder 2, thereby causing the ferrule to be increasingly deformed elastically in a radially outward direction and in a circumferential direction until the face 35 of the annulus 34 comes into abutment against the front face 11, via the rim of the gasket or film 18, if any. The flank 70 of each catch 69 then coincides with the flank 73 of the groove 72 and the natural tendency of the ferrule 5 to return elastically to its original shape causes the catches 69 to engage in the groove 72 until they occupy a position in which their flanks 70 bear against the flanks 73 of the groove in the direction opposite to the direction 13, thus fastening the ferrule 5, i.e. the ring 4, to the cylinder 2 against separation in the longitudinal direction.

The person skilled in the art will readily understand that the groove 72 could be replaced by as many depressions in the outside peripheral face 12 as there are catches 69 without that going beyond the ambit of the present invention.

In another variant, shown in FIG. 11, it is also possible to fasten the ferrule 5, i.e. the ring 4, to the annular end 3 of the cylinder 2 by transverse pins that are regularly distributed circumferentially, e.g. by means of radial rivets 76 passing through the ferrule 5 in a zone situated beyond, in the direction 13, the setback 17 for receiving the sealing gasket 18, and anchored in respective blind holes pierced in the outside peripheral face 12 of the annular end 3 of the cylinder 2. These rivets could be replaced by screws, or by any other mechanical means for directly fastening the ferrule 5 to the annular end 3 of the cylinder 2 without that going beyond the ambit of the present invention. The number of pins required for providing the required degree of fastening can readily be determined by the person skilled in the art.

FIG. 11 also shows a setback 17 of a shape that is different from that described with reference to FIGS. 5 to 8, together with an associated different shape for the sealing gasket 18 which is held in radial sealing compression against the inside peripheral face 23 of the ferrule 5 and which does not have a rim extending over the front face 11 of the annular end 3 of the cylinder 2. Nevertheless, it should be understood that regardless of the way in which the ferrule 5 is fastened to said annular end 3, sealing between them can be provided by any of the means described with reference to FIGS. 3, 5 to 9, and 11, with any compatible combination between the various dispositions described and shown in the present specification being considered as coming within the ambit thereof.

Thus, FIGS. 18 and 19 show a variant implementation of the present invention combining various dispositions that are described above.

Thus, the variant shown in FIGS. 18 and 19 is similar to the variant shown in FIG. 11 in that it uses a sealing gasket 18 which does not have a rim on the front face 11 of the annular end 3 of the cylinder 2.

In this variant, the setback 17 is narrowly located at the junction between the front face 11 and the outside peripheral face 12 of the annular end 3 of the cylinder 2 in that its bottom wall 19 is of much smaller longitudinal size, compared with the longitudinal size of the outside peripheral face 12 than is the case in the variants described with reference to FIGS. 5 to 10. In contrast, the shoulder 21 which defines the setback 17 in the direction 13 presents a radial dimension greater than that which is presented in the above-mentioned variants, relative to the radial dimension (not referenced) between the outside peripheral face 12 (e.g. where it joins the shoulder 21) and the inside peripheral face 10 of the cylinder 2. In the example shown, the bottom wall 19 and the shoulder 21 defining the setback 17 are both circularly frustoconical about the axis 9 (not shown in FIGS. 18 and 19) and they flare in the direction 13 with the shoulder 21 flaring more than the bottom wall 19, and the transition between the shoulder 21 and the outside peripheral face 12 of the annular end 3 of the cylinder 2 presents a diameter of substantially the same size as that of the free edge 25 of the ferrule 5 of the ring 4 when said ferrule 5 is in the rest state as shown in FIG. 18.

In association with a setback 17 of this shape, the sealing gasket 18 has a "drop" shape which, when seen in section on an axial plane as is the case in FIGS. 18 and 19, comprises a flat zone 91 and an enlarged zone 92 respectively constituting a downstream zone and an upstream zone relative to the direction 13.

The sealing gasket 18 is shaped and dimensioned in such a manner as to be mounted on the end 3 of the cylinder 2 in a state of circumferential elastic extension, and in a position in which:

the flat zone 91 fits snugly against the marginal portion of the outside peripheral face 12 immediately adjacent to the shoulder 21, from which said zone 19 extends in the direction 13 over a longitudinal distance that is much shorter than the longitudinal distance between the shoulders 14 and 21, being for example about one-third of said longitudinal distance; and the zone 92 bent towards the axis 9 relative to the zone 91 fits snugly against the shoulder 21 and at least a portion of the bottom wall 19 immediately adjacent to said shoulder 21, thereby contributing to holding the gasket 18 against being moved in the direction 13 over the annular end 3 of the cylinder 2 while the female end ring 4 is being put into place on said end 3 under conditions that are described below, and forms an axial projection in the direction opposite to the direction 13 relative to a coplanar geometrical extension (not shown) of the front face 11 of the end 3 of the cylinder 2 when, as shown in FIG. 18, the female end ring 4 is not yet in place on the annular end 3 of the cylinder 2.

When in the rest state as shown in FIG. 18, the female end ring 4 is of the shape described with reference to FIGS. 1 to 5 except that instead of being smooth or instead of having a plurality of longitudinally distributed continuous annular portions in relief as shown in FIG. 3, e.g. constituted by ribs that are elastically and/or plastically compressible transversely, the inside peripheral face 23 of the ferrule 5 has only one such continuous annular portion in relief 29 that is elastically and/or plastically compressible transversely, that is integrally formed with the ferrule 5 and that is situated at a longitudinal distance from the face 35 of the annulus 34 that is greater than the longitudinal distance between the front face 11 and the downstream limit of the gasket 18 relative to the direction 13, although shorter than the longitudinal distance between the free edge 25 of the ferrule 5 and the face 35 of the annulus 34. More precisely, the portion in relief 29 is substantially closer, longitudinally, to the free edge 25 than to the face 35.

In the example shown, this portion in relief 29 is defined by a shoulder facing in the direction 13 and interconnecting two zones that are not referenced but both belonging to the inside peripheral face 23 and that has substantially the same cone angle when the ferrule 5 is in the rest state, as shown in FIG. 18.

The skirt 6 of the ring 4 is of a shape that is completely identical to that described above, and in particular it is suitable for receiving internally and retaining a gasket 62 that is identical to that described with reference to FIGS. 7 and 8 and suitable for providing leakproofing relative to a male endpiece 7 of a cylinder 55 of a pipe 8, e.g. one identical to the pipe 1, under the same conditions as those described with reference to FIGS. 7 and 8, and as shown in FIG. 19.

The ring 4 designed in this way is mounted and fastened to the end zone 3 of the cylinder 2 under conditions that are identical to those described above with reference to FIGS. 5 and 6, either before or after the gasket 62 has been put into place in the skirt 6.

In particular, prior to engaging the female end ring in the direction 13 by force on the end zone 3 of the cylinder 2 provided with the sealing gasket 18, respective continuous annular beads of adhesive 53 and 54 that are circular about the axis 9 are placed on an annular location of the zone 92 having a diameter approximately identical to that of the free edge 25 of the ferrule 5, i.e. where initial contact is made between the ferrule 5 and the gasket 18 when the ferrule of the ring 4 is engaged coaxially by force on the end 3, in the direction 13, and at the downstream limit of said gasket 18 relative to the direction 13, i.e. more precisely at the transition between the zone 91 of said gasket and the outside peripheral face 12 of the end zone 3 of the cylinder 2. Thus, as the ferrule 5 of the ring 4 is progressively forced onto the end 3 in the direction 13, the inside peripheral face 23 of the ferrule 5 entrains in succession the adhesive of the bead 53 and then the adhesive of the bead 54 and it spreads said adhesive over the zone 91 of the gasket 18 and over the portion of the outside peripheral face 12 of the end zone 3 that is progressively covered by the inside peripheral face 23 of the ferrule 5.

The presence of the annular portion in relief 29 makes such spreading of the adhesive in the bead 53 and then in the bead 54 easier, making it possible initially to create a thin film of still-fresh adhesive that is continuous both in the circumferential direction and in the longitudinal direction between the inside peripheral face 23 and both the sealing gasket 18 and the outside peripheral face 12, thereby easing relative longitudinal sliding, and then, as this adhesive sets, creating fastening that is likewise as continuous as possible both in the circumferential direction and in the longitudinal direction between the inside peripheral face 23 and both the sealing gasket 18 via its zone 91 and the outside peripheral face 12.

This engagement movement of the ferrule 5 of the female end ring 4 under force over the end zone 3 of the cylinder 2 causes the zone 91 of the gasket 18 to be compressed progressively in the radial direction between the inside peripheral face 23 of the ferrule 5 which is progressively being extended elastically in the circumferential direction and the outside peripheral face 12 of the annular end 3 of the cylinder 2, thereby providing effective sealing at the gasket, and then causes the zone 92 to be elastically compressed in the longitudinal direction between the face 35 and the shoulder 21 and the bottom wall 19 of the setback 17, thereby also establishing sealing at this location when the face 35 of the annulus 34 of the ring 4 comes into abutment in the direction 13 against the front face 11 of the annular end 3 of the cylinder 2, thus defining the final relative position of the ring 4 relative to the cylinder 2, as shown in FIG. 19.

In this position, the inside peripheral face 23 of the ferrule 5, which is in a state of elastic circumferential extension, presses elastically against the outside peripheral face of the annular end 3 of the cylinder 2 in two zones, namely:

indirectly via the zone 91 of the gasket 18 in the portion of the face 12 covered by said zone 91; and directly via the annular portion in relief 29; and possibly also in a third zone, i.e. directly at the free edge 25.

This provides particularly effective sealing between the ferrule 5 and the annular end 3 of the cylinder 2, with this sealing being further increased by the face 35 of the annulus 34 pressing against the zone 92 of the gasket 18.

The ring 4 is thus likewise fastened in particularly effective manner via its ferrule 5 to the annular end 3 of the cylinder 2, both because of the presence of the adhesive and because of the mutual compression in a direction that is approximately radial relative to the axis 9.

The person skilled in the art will readily understand that other variations in implementation and relative positioning of the female end ring 4, of the sealing gasket 18, and of the annular end of the cylinder 2, are all possible without thereby going beyond the ambit of the present invention, in particular by combining various ones of the dispositions described and shown above.

Thus, although the ferrule 5 is described with reference to FIGS. 5 to 9, 11, 18, and 19 as being mounted on the annular end 3 of the cylinder 2 by progressive forced engagement, generally with an interposed lubricant which can advantageously be constituted by an adhesive that subsequently contributes to mutual fastening and leakproofing, it is also possible for the ferrule 5 of the ring 4 to be subjected temporarily to radial and circumferential elastic expansion while it is being engaged coaxially on the annular end 3 by using means other than pressing against the outside peripheral face 12 of said annular end 3 and of the sealing gasket or film 18, if any, for the purpose of making such forced engagement easier or even for replacing it with mere mutual engagement without compression and consequently without friction between the inside peripheral face 23 of the ferrule 5 of the ring 4 and the outside peripheral face 12 of the annular end 3 of the cylinder 2, and of the sealing gasket or film 18, if any, with the ferrule 5 subsequently being allowed to return to a state in which it applies such mutual compression only after it has reached the limit position in which the face 35 of the annulus 34 bears flat in the direction 13 against the front face 11 of the annular end 3 of the cylinder 2, and via the rim of the sealing gasket or film 18, if any.

Such an implementation presents the advantage of making it possible to omit any lubricant between the inside peripheral face 23 of the ferrule 5 of the ring 4 and the outside peripheral face 12 of the annular end 3 of the cylinder 2, and the sealing gasket or film 18, if any, consequently encouraging mutual fastening by friction, possibly without adding any additional fastening means.

To this end, it is possible to heat the ring 4 so as to cause it to expand thermally on a temporary basis, and to remove heating once the ring has reached its limit position for longitudinal engagement on the annular end 3 of the cylinder 2, and this can be sufficient when the outside peripheral face 12 of the annular end 3 of the cylinder 2 and of the sealing gasket or film 18, if any, and when the ferrule 5 of the ring 4 have the shape described with reference to FIGS. 3, 5 to 8, or 9, and concerning the sealing gasket 18, the shape described with reference to FIG. 11. It is also possible to use mechanical means for this purpose, using a method which is described with reference to FIGS. 12 to 17, both with shapes as described with reference to FIGS. 3, 5 to 9, and 11, and more particularly with a shape that is described below with reference to FIG. 10.

In this figure, there can be seen the cylinder 2, the ring 4, and the sealing gasket or film 18 identical to those described with reference to FIGS. 5 to 8, and having the same numerical references for their various components, with the exception of the differences described below.

At rest, i.e. before being put into place on the cylinder 2, the ring 4 is completely identical to that described with reference to FIGS. 1 to 5. In contrast, although the sealing gasket or film 18 remains uniform where it has a rim over the front face 11 of the annular end 3 of the cylinder 2, over the chamfer 16 thereof, and over the most part of its longitudinal extent going away from the chamfer 16 to the vicinity of the shoulder 21 of the setback 17, in the immediate vicinity of said shoulder 21 it presents a continuous annular bulge 77 forming a ring which is circular in section on any section plane containing the axis 9, the sealing gasket or film 18 being described prior to the ring 4 having its ferrule 5 put into place on the annular end 3 of the cylinder 2. To receive a corresponding portion of the bulge 77, the bottom wall 19 of the setback 17 is locally indented in the immediate vicinity of the shoulder 21 to form a continuous annular groove 78 whose section is that of a circular arc on any plane that contains the axis 9 so as to be able to receive this portion of the bulge 77, whereas the remainder thereof projects radially away from the axis 9 from the outside peripheral face 12 of the annular end 3 of the cylinder 2 and also from the portion of the sealing gasket or film 18 which lies on the bottom wall 19 of the setback 17.

The person skilled in the art will readily understand that when the ferrule 5 presses its inside peripheral face 23 against the outside peripheral face 12 of the annular end 3 of the cylinder 2 and against the sealing gasket or film 18 on respective opposite sides of the bulge 77, this bulge 77 gives rise to a longitudinally localized increase in the circumferential tension of the ferrule 5 and in the contact pressure against the inside peripheral face 23 thereof.

Preferably, as shown in FIG. 10, where chain-dotted lines represent the position of the ferrule 5 when the ring 4 is pressed via the face 35 of the annulus 34 against the front face 11 of the annular end 3 of the cylinder 2 through the rim of the sealing gasket or film 18, the hardness and the dimensions of the bulge 77 are selected and the ring 4 is put into place via its ferrule 5 on the annular end 3 of the cylinder 2 and on the sealing gasket or film 18 in such a manner that, in this limit position, the bulge 77 causes a corresponding continuous annular groove 79 to be formed in the inside peripheral face 23 of the ferrule 5 having a shape that is exactly complementary to the portion of the bulge 77 that projects from the outside peripheral face 12 of the annular end 3 of the cylinder 2 and from the portion of the sealing gasket or film 18 that corresponds to the bottom wall 19 of the setback 17, and does so in particular by giving rise to localized plastic deformation of the ferrule 5.

To this end, and in order to enable the ferrule 5 to go past the bulge 77 of the sealing gasket or film 18 while it is being put into place thereon and on the outside peripheral face 12 of the annular end 3 of the cylinder 2 without difficulty and without giving rise to damage, it is preferable for this installation to be performed by the method described below with reference to FIGS. 12 to 17, it being understood that in certain conditions it would still be possible to put the ferrule in place as a force-fit as described with reference to FIGS. 1 and 9 to 11, or by temporary thermal expansion of the ring 4, and in particular of its ferrule 5, even when the sealing gasket or film 18 presents a bulge 77 as described with reference to FIG. 10.

For mounting the ring 4 via its ferrule 5 on the annular end 3 of the cylinder 2, FIGS. 12 to 17 show the use of a method which consists in causing the ferrule 5 temporarily to take up a state of circumferential expansion that is greater than the circumferential expansion it will occupy once it is resting against the outside peripheral face 12 of the annular end 3 of the cylinder 2 and on the sealing gasket or film 18 generating its own pressure for sealing purposes. This enlarged state is maintained temporarily, i.e. for the time required to move the ring 4 in longitudinal translation relative to the annular end 3 of the cylinder 2 until the face 35 of the annulus 34 comes to bear flat against the front face 11 of the annular end 3 of the cylinder 2, via the rim of the sealing gasket or film 18, if any. The ferrule 5 is then allowed to leave this circumferentially extended state so that the elasticity of the ferrule 5 establishes the required transverse pressure once the said relative position has been reached.

Instead of using thermal means for temporarily expanding the ring 4, and in particular its ferrule 5, it is possible to cause such temporary expansion by mechanical means in this version of the method as shown in FIGS. 12 to 17.

FIG. 12 shows the ring 4 in the rest state and, on the same axis as the ring 4 and longitudinally facing the free edge 25 of the ferrule 5, there can also be seen an annular tool 80 for expanding the ferrule 5 circumferentially and radially.

This tool 80 is essentially constituted by a semi-rigid hoop 81 which is described in this position of axial alignment with the ring 4.

In the rest state shown in FIG. 12, the hoop 81 is defined towards the axis 9 and going away from the axis 9 by an inside peripheral face 82 and by an outside peripheral face 83, respectively, both being circular cylinders about the axis 9, and between these faces 82 and 83 the thickness of the hoop 81 is as small as possible while nevertheless being sufficient to ensure that it has mechanical strength suitable for the use described below. In the direction 13 and in the direction opposite to the direction 13, the faces 82 and 83 are connected together respectively by a downstream front face 84 and by an upstream front face 85, both of which are circular annuluses about the axis 9, plane, and perpendicular to the axis. Between the two front faces 84 and 85, the hoop 81 presents a longitudinal size or length that is no longer than that of the face 23 between the face 35 of the annulus 34 and the free edge 25, and that is preferably no greater than or approximately equal to the difference between said longitudinal side of the face 23 and the longitudinal distance between the bulge 77 of the sealing gasket or film 18 and the front face 11 of the annular end 3 of the cylinder 2 or the extreme limit of the rim of the sealing gasket or film 18, if any, on said front face 11. The inside peripheral face 82 has a diameter greater than the maximum diameter of the bulge 77 and greater than the diameter presented by the face 12 at a longitudinal distance from the free edge 25 of the ferrule 5 when it bears flat via the face 35 of the annulus 34 against the front face 11 of the annular end 3 of the cylinder 2, via the rim, if any, of the sealing gasket or film 18 on said front face 11, which distance corresponds to the longitudinal size of the hoop 81 between its front faces 84 and 85.

On its downstream front face 84 the hoop 81 carries a plurality of rigid tabs 86 that are uniformly distributed angularly around the axis 9 (apart from two of them which are adjacent to each other), the tabs projecting radially from the outside peripheral face 83, i.e. away from the axis 9, without projecting radially from the inside peripheral face 82, i.e. towards the axis 9. By way of non-limiting example, two of these tabs 86 are shown as being in diametrically opposite positions, a third tab 86 on a diameter perpendicular to the diameter between the above-mentioned two tabs 86, and two more tabs 86 are adjacent to each other and placed symmetrically about a position that is diametrically opposite to the above-mentioned third tab 86.

Between these two adjacent tabs 86, the hoop 81 is split obliquely, i.e. on a plane that is not referenced and that is oblique relative to the axis 9 so as to define two plane end faces 87 perpendicular to the inside and outside peripheral faces 82 and 83 but oblique, e.g. at 45°, relative to the front faces 84 and 85. When the hoop 81 is in the rest state, as shown in FIG. 12, these two end faces 87 press against each other in the circumferential direction so as to cause the hoop 81, its peripheral faces 82 and 83, and its front faces 84 and 85 to appear to be continuous.

Nevertheless, starting from this rest state and as shown in FIG. 13, it is possible to offset one of the end faces 87 relative to the other so that they slide longitudinally over each other in a direction compatible with the oblique section, where necessary after putting the hoop 81 under stress, thus enabling the diameter of the inside and outside peripheral faces 82 and 83 thereof to be reduced, and in particular reducing the diameter of the outside peripheral face 83 to a value which is smaller than the diameter of the inside peripheral face 23 of the ferrule 5 in the vicinity of its edge 25. The hoop 81 can thus be inserted in the direction opposite to the direction 13 into the ferrule 5 so that its outside peripheral face 83 comes against the inside peripheral face 23 of the ferrule until the tab 86 closest to the end face 87 which is offset upstream relative to the direction 13 relative to the other end face 87 comes to bear in the direction opposite to the direction 13 against the free edge 25, with at least one other tab close to the same side of the split in the hoop 81 coming to bear thereagainst while the other tabs 86, although offset downstream from the free edge 25, are distant therefrom by distances which are less than the longitudinal dimension of the hoop 81 between its front faces 84 and 85 such that the outside peripheral face 83 of the hoop 81 is engaged in full or in part, depending on the zone thereof under consideration, against the entire circumferential dimension of the inside of the ferrule 5 against the face 23 thereof. With the hoop 81 in this state of radial contraction as shown in FIG. 13, the ring 4 is still in its rest state.

Then, as shown in FIG. 13, a mandrel 81 is forced longitudinally in the direction opposite to the direction 13 into the hoop 81 as engaged in the ferrule 5 of the ring 4. The mandrel 88 is defined going away from the axis 9 by an outside peripheral face 89 that is circularly frustoconical about said axis and that converges in the direction opposite to the direction 13 between a minimum diameter that is smaller than the diameter then presented by the inside peripheral face 82 of the hoop 81, which diameter can easily be deduced by the person skilled in the art from the diameter of the inside peripheral face 23 of the ferrule 5 given the thickness of the hoop 81 between its inside and outside peripheral faces 82 and 83, and a maximum diameter that is not less than the diameter presented by the inside peripheral face 82 of the hoop 81 when in the rest state.

The person skilled in the art will readily understand that this coaxial insertion of the mandrel 88 into the hoop 81 and thus into the ferrule 5 of the ring 4 causes the diameter of the inside peripheral face 82 of the hoop 81 to expand progressively, consequently causing the diameter both of its outside peripheral face 83 and of the inside peripheral face 23 of the ferrule 5 to expand, thus expanding the ferrule both radially and circumferentially.

The mandrel 88 continues to be inserted coaxially in the direction opposite to the direction 13 into the hoop 81 while it is itself received inside the ferrule 5 until the inside and outside peripheral faces 82 and 83 have returned to the diameter they present when at rest, and this is accompanied by the end faces 87 sliding over each other until they are again pressed flat one against the other, and the hoop 81 as a whole has returned to its rest configuration. At this point, all of the tabs 86 are pressed in the direction opposite to the direction 13 against the free edge 25 of the ferrule 5, as shown in FIG. 14, and the ring 4 and the tool 80 as inserted in this ferrule 5 temporarily constitute an assembly 90 which is stabilized by the end faces 87 bearing against each other circumferentially under the effect of the radial pressure applied by the ferrule 5 to the hoop 81, it then being possible to extract the mandrel 88 in the direction 13.

Given the diameter then presented by the inside peripheral face 82 of the hoop 81, the assembly 90 can be engaged in the direction 13 on the annular end 3 of the cylinder 2 and on the sealing gasket or film 18, including its bulge 77, quite freely until the limit position is reached in which the annulus 34 bears via its face 35 in the direction 13 against the front face 11 of the annular end 3 of the cylinder 2, via the rim, if any, of the sealing gasket or film 18, which corresponds to the state shown in FIG. 15.

Then, by applying thrust or shocks in the direction 13 to the tabs 86 (which tabs extend radially far enough to project from the outside peripheral face 24 of the ferrule 5) it is possible to extract the hoop 81 from the free edge 25 while keeping the ring in the above-mentioned limit position insofar as the annulus 34 is kept bearing via its face 35 against the front face 11, via the rim, if any, of the sealing gasket or film 18 so as to prevent the ring 4 from moving together with the tool 80 relative to the cylinder 2.

As soon as the upstream front face 85 of the hoop 81 escapes from the ferrule 5, the ferrule contracts elastically to press its inside peripheral face 23 against the outside peripheral face 12 of the annular end 3 of the cylinder 2 and against the sealing gasket or film 18 whose bulge 77 gives rise to a localized increase in pressure in a continuous ring causing the groove 79 to be formed in the inside peripheral face 23 of the ferrule 5, preferably by plastic deformation of the ferrule 5.

In order to make it easier to extract the tool 80 from the ferrule 5, the longitudinal distance between the shoulder 14 of the cylinder 2 and its front face 11, or the upstream limit of the rim, if any, of the sealing gasket or film 18 on said front face 11 is greater than the longitudinal distance between the free edge 25 of the ferrule 5 and the face 35 of the annulus 34 by an amount greater than the longitudinal dimension of the hoop 81 between its upstream front face 85 and the downstream limit of the tabs 86 fixed to its downstream front face 84 so that during extraction the tool 80 does not come into abutment the shoulder 14 before it has been fully disengaged from the ferrule 5.

Thereafter, the hoop 81 can be opened by applying traction in a circumferential direction on opposite sides of its split between the faces 87 so as to open up the split and enable the tool 80 to be removed either by sliding it in the direction 13 over the outside peripheral face 15 of the cylinder 2 or in the direction opposite to the direction 13 over the ring 4.

The pipe 1 is then terminated, as shown in FIG. 16, and the skirt 6 of the ring 4 constitutes its female endpiece 54 into which it is possible subsequently to mount (if this has not already been done) a sealing gasket, e.g. 62 of the type described with reference to FIGS. 7 and 8, and then subsequently insert coaxially the male endpiece 7 of the other pipe 8, as shown in FIG. 17.

Transposing this method of mounting the ring 4 on the cylinder 2 in the absence of a sealing gasket or film 18, possibly replacing it with at least one sealing ring of plastic material, or in the case of a different shape for the sealing gasket 18, comes within the normal competence of a person skilled in the art.

In general, such a person skilled in the art will understand that the present invention can be implemented in a wide variety of ways differing from those described above, in particular by combining the variants described insofar as they are mutually compatible, without that going beyond the ambit of the invention.

What is claimed is:

1. A pipe comprising:
a concrete cylinder possessing at least one annular end of determined longitudinal axis, defined by a longitudinal outside peripheral face and by a transverse front face;
a female and ring coaxial with said end and secured thereto, the ring consisting of:
firstly a longitudinal ferrule for securing to the cylinder, the ferrule being defined by a longitudinal inside peripheral face fitting snugly against said outside peripheral face in the immediate vicinity of said front face; and
secondly a longitudinal skirt projecting longitudinally over said front face to engage coaxially on a male endpiece of another pipe,
wherein the ferrule is in a state of circumferential elastic tension providing sealing relative to said outside peripheral face by said inside peripheral face applying thereagainst transverse pressure which is circumferentially distributed in a continuous manner,
wherein said outside peripheral face and said inside peripheral face flare in the longitudinal direction going away from said front face and relative to the transition between the ferrule and the skirt,
wherein said inside peripheral face presents one continuous annular sealing portion in relief facing said out aide peripheral face in a state of compression thereagainst, formed integrally with the ferrule,
wherein said continuous annular portion in relief comprises a single rib which is substantially closer, longitudinally, to a free edge of the ferrule than to said transition, said free edge being longitudinally opposite said transition and
wherein said inside peripheral face is fastened to said outside peripheral face by annular adhesive between them.

2. A pipe according to claim 1, wherein said circumferential elastic tension is such that said inside peripheral face is fastened, in part, to said outside peripheral face by the mutual friction that results from said transverse pressure.

3. A pipe according to claim 1, further including at least one band coaxially surrounding the ferrule and placed in circumferential tension.

4. A pipe according to claim 1, further including an annular sealing gasket of an elastically compressible material interposed in elastic transverse compression stress between said inside peripheral face and said outside peripheral face, at least in the immediate vicinity of said front face,
wherein said gasket is in the form of a film, and
wherein said film extends from said front face over a longitudinal dimension shorter than the respective longitudinal dimensions of said outside peripheral face and of inside peripheral face.

5. A pipe according to claim 4, wherein said outside peripheral face presents a localized annular setback in the immediate vicinity of said front face and in that said gasket is received over a fraction of its thickness in said setback.

6. A pipe according to claim 4, wherein said inside peripheral face is fastened to said film by annular adhesive between them.

7. A pipe according to claim 1, wherein the inside of the ring presents longitudinal abutment means for engaging said front face, the abutment means being located at the transition between the ferrule and the skirt projecting transversely relative to said inside peripheral face and being placed facing said front face.

8. A pipe according to claim 7, wherein the skirt also presents a longitudinal inside peripheral face, and in that the abutment means serves as a longitudinal abutment for said male endpiece.

9. A pipe according to claim 8, wherein the abutment means comprise a transverse annulus that is circumferentially continuous, and that presents a longitudinal dimension that is uniform.

10. A pipe according to claim 7, further comprising an annular sealing gasket interposed between said inside peripheral face of the ferrule and said outside peripheral face wherein said gasket is in the form of a film forming an annular rim extending transversely on said front face;
and in that the longitudinal abutment means press longitudinally against said front face via said rim.

11. A pipe according to claim 1, wherein the inside of the skirt presents a shape suitable for receiving and holding at least one transverse annular sealing gasket for engaging the male endpiece.

12. A pipe according to claim 11, wherein the inside of the skirt has at least one transverse annular sealing gasket fixed thereto for engaging the male endpiece.

13. A female end ring for use in making a pipe, comprising:
a longitudinal ferrule defined by a longitudinal inside peripheral face; and
a longitudinal skirt situated axially in line with the ferrule, the ferrule being elastically expandable circumferentially,
wherein said inside peripheral face flares in the longitudinal direction going away from the transition between the ferrule and the skirt,
wherein said inside peripheral face presents at least one continuous annular portion in relief that is compressible transversely and that is integral with the ferrule,
wherein said continuous annular portion in relief is in the form of a single rib, and
wherein said rib is substantially closer, longitudinally, to a free edge of the ferrule than to said transition, said free edge being longitudinally opposite said transition.

14. A female end ring according to claim 13, further comprising abutment means on the inside at the transition between the ferrule and the skirt, the abutment means projecting transversely relative to said inside peripheral face.

15. A female end ring according to claim 14, wherein the skirt also presents a longitudinal inside peripheral face and in that the abutment means also project transversely relative thereto.

16. A female end ring according to claim 15, wherein the abutment means comprise a circumferentially continuous transverse annulus of uniform longitudinal dimension.

17. A female end ring according to claim 13, wherein the inside of the skirt is shaped suitably to receive and to hold at least one transverse annular sealing gasket.

18. A female end ring according to claim 17, wherein the inside of the skirt is integral with at least one transverse annular sealing gasket.

19. A female end ring according to claim 13, wherein the ferrule and the skirt present respective shapes and transverse dimensions suitable for enabling a plurality of rings to be nested releasably and coaxially by nesting the ferrule of one with the skirt of another.

20. A method of manufacturing a pipe, the pipe comprising:
a concrete cylinder possessing at least one annular end having a longitudinal axis, defined by a longitudinal outside peripheral face and by a transverse front face;
a female end ring coaxial with said end and secured thereto, the ring consisting of:
firstly a longitudinal ferrule for securing to the cylinder, the ferrule being defined by a longitudinal inside peripheral face fitting snugly against said outside peripheral face in the immediate vicinity of said front face; and
secondly a longitudinal skirt projecting, longitudinally over said front face to engage coaxially on a male endpiece of another pipe,
said method comprising,
a) making the ring so that, at a predetermined longitudinal distance from the transition between the ferrule and the skirt, when the ring is not expanded circumferentially, said inside peripheral face has transverse dimensions that are smaller than corresponding dimensions of said outside peripheral face at the same longitudinal distance from said front face; and
b) engaging the ferrule coaxially on the annular end of the cylinder to a determined relative position in which said transition coincides longitudinally with said front face, and fastening the ferrule to the cylinder in said determined relative position by placing said ferrule in a state of circumferential elastic tension providing sealing relative to said outside peripheral face by said inside peripheral face applying thereto transverse pressure that is distributed circumferentially in a continuous manner,
wherein, step a), the ring and the cylinder are prefabricated in such a manner that at least one of said outside peripheral face and said inside peripheral face flare relative to their respective longitudinal axes in a longitudinal direction going away respectively from said front face and from the transition between the ferrule and the skirt, and that said inside peripheral face presents one continuous annular rib in relief, which is compressible, transversely, and formed integrally with the ferrule, said rib being substantially closer, longitudinally, to a free edge of the ferrule than to said transition, said free edge being longitudinally opposite said transition,
wherein between steps a) and b), a ring of adhesive is deposited on a localized zone of at least one of said outside peripheral face and said inside peripheral face selected in such a manner that during and after engaging the ferrule on the cylinder, said zone constitutes a zone of mutual contact via said adhesive and of application of said transverse pressure, and that, as the ferrule is engaged coaxially on the annular end of the cylinder, when implementing step b), said rib facilitates the entrainment of said adhesive by the ferrule and the creation of a film thereof, and
wherein said adhesive serves as a lubricant during engagement of the ferrule coaxially onto the annular end of the cylinder, and subsequently serves to fasten them together.

21. A method according to claim 20, wherein said circumferential elastic tension is such that said inside peripheral face is fastened at least in part to said outside peripheral face by the mutual friction that results from said transverse pressure.

22. A method according to claim 21, wherein said friction is reinforced by banding the ferrule in said determined relative position.

23. A method according to claim 20, wherein coaxial engagement of the ferrule on the annular end of the cylinder during step b) is facilitated by heating the ferrule.

24. A method according to claim 20, wherein during step a) the cylinder is prefabricated in such a manner that said outside peripheral face flares more than does said inside peripheral face relative to their respective longitudinal axes.

25. A method according to claim 20, wherein between steps a) and b), a sealing gasket of elastically compressible material is put into place on said outside peripheral face at least in the immediate vicinity of said front face,
wherein said gasket is selected in such a manner that it is in the form of a film,
wherein said film is selected and placed in such a manner that it extends from said front face over a longitudinal dimension that is less than the longitudinal dimensions respectively of said outside peripheral face and of said inside peripheral face,
and wherein during step b), said gasket is put into elastic transverse compression stress between said inside peripheral face and said outside peripheral face.

26. A method according to claim 25, wherein, during step a), the cylinder is prefabricated in such a manner that said outside peripheral face presents a localized annular setback in the immediate vicinity of said front face, and in that between steps a) and b), said gasket is put into place by being received over a fraction of its transverse dimension in said setback.

27. A method according to claim 25, wherein between steps a) and b), after said film has been put into place, another ring of adhesive is deposited on at least one of a localized zone of said film and another localized zone of said inside peripheral face, selected in such a manner that during implementation of step b) and subsequently, said one zone constitutes a zone of mutual contact via said adhesive and of application of said transverse pressure, and that, as the ferrule is engaged coaxially on the annular end of the cylinder, when implementing step b), said rib facilitates the entrainment of said adhesive by the ferrule and the creation of a film thereof.

28. A method according to claim 20, wherein during step b) coaxial engagement or the ferrule on the annular end of the cylinder is stopped when a longitudinal abutment means mounted on said ferrule comes into abutment against said front fade.

29. A method according to claim 28, wherein between steps a) and b) a sealing gasket in the form of a film is placed on said outside peripheral face and an annular transverse rim of said film is formed on said front face, and
in that during step b), said coaxial engagement is stopped when the longitudinal abutment means come into abutment against said front face via said rim.

30. A method according to claim 20, wherein in step a) or after step b), at least one transverse annular sealing gasket for engaging the male endpiece is secured to the inside of the skirt.

* * * * *